US012578244B2

(12) United States Patent
Heller et al.

(10) Patent No.: US 12,578,244 B2
(45) Date of Patent: Mar. 17, 2026

(54) PRESSURE SENSOR AND METHOD OF MANUFACTURING PRESSURE SENSOR

(71) Applicant: ROHM CO., LTD., Kyoto (JP)

(72) Inventors: Martin Wilfried Heller, Kyoto (JP); Toma Fujita, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 315 days.

(21) Appl. No.: 18/337,502

(22) Filed: Jun. 20, 2023

(65) Prior Publication Data

US 2023/0417613 A1    Dec. 28, 2023

(30) Foreign Application Priority Data

Jun. 24, 2022    (JP) ................................. 2022-102076

(51) Int. Cl.
*G01L 9/00*        (2006.01)
(52) U.S. Cl.
CPC .......... *G01L 9/0047* (2013.01); *G01L 9/0098* (2013.01)
(58) Field of Classification Search
None
See application file for complete search history.

(56) References Cited

U.S. PATENT DOCUMENTS

| | | | | |
|---|---|---|---|---|
| 8,316,718 | B2 * | 11/2012 | Lin ..................... | B81C 1/00309 |
| | | | | 73/718 |
| 2018/0038754 | A1 * | 2/2018 | Marsh ................... | G01L 9/0073 |
| 2018/0188127 | A1 * | 7/2018 | Ermolov .............. | B81B 3/0051 |
| 2018/0299337 | A1 * | 10/2018 | Baldo ................. | B81C 1/00158 |

FOREIGN PATENT DOCUMENTS

| | | | | | |
|---|---|---|---|---|---|
| CN | 103872050 | A | * | 6/2014 | ............. H10D 84/40 |
| CN | 114720048 | A | * | 7/2022 | ............. G01L 21/00 |
| JP | 2013011587 | A | * | 1/2013 | ......... B60C 23/0488 |
| JP | 2021-025966 | A | | 2/2021 | |
| JP | 2025030664 | A | * | 3/2025 | |

* cited by examiner

*Primary Examiner* — Andre J Allen
(74) *Attorney, Agent, or Firm* — RABIN & BERDO, P.C.

(57)        ABSTRACT

A pressure sensor includes: a substrate having first and second main surfaces and having a thickness in first direction; a first chamber recessed from the first main surface in the first direction with respect to the substrate; a second chamber recessed from the first main surface in the first direction with respect to the substrate and adjacent to the first chamber in second direction; a fluid passage recessed from the first main surface in the first direction with respect to the substrate and causing the first chamber to be in fluid communication with an outside; a closing layer laminated on the first main surface of the substrate and closing openings of the first chamber and the second chamber; and a membrane partitioned by the first and second chambers in the second direction and extending in a plane parallel to the first direction and a third direction.

20 Claims, 24 Drawing Sheets

PRESSURE SENSOR AND METHOD OF MANUFACTURING PRESSURE SENSOR

CROSS-REFERENCE TO RELATED APPLICATION

This application is based upon and claims the benefit of priority from Japanese Patent Application No. 2022-102076, filed on Jun. 24, 2022, the entire contents of which are incorporated herein by reference.

TECHNICAL FIELD

The present disclosure relates to a pressure sensor and a method of manufacturing the pressure sensor.

BACKGROUND

MEMS (Micro Electro Mechanical System) sensors manufactured by using semiconductor micro-fabrication technology is known. As a MEMS sensor, a pressure sensor is disclosed in the related art. The pressure sensor disclosed in the related art has a cavity formed in a substrate and a silicon diaphragm (hereinafter referred to as a membrane) that seals the cavity, and is configured to be capable of detecting an external air pressure by electrically detecting deformation of the membrane based on a difference between an air pressure inside the cavity and an external air pressure.

BRIEF DESCRIPTION OF DRAWINGS

The accompanying drawings, which are incorporated in and constitute a part of the specification, illustrate embodiments of the present disclosure.

FIG. 7C is a view showing a next step of FIG. 7B.

FIG. 7D is a view showing a next step of FIG. 7C.

FIG. 13 is a plan view showing a sensor of a pressure sensor according to a second embodiment of the present disclosure.

FIG. 17 is a plan view showing a sensor of a pressure sensor according to a fourth embodiment of the present disclosure.

FIG. 20 is an equivalent circuit diagram of the pressure sensor of FIG. 19.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

A pressure sensor according to an embodiment of the present disclosure will be described below with reference to the accompanying drawings. It should be noted that the following description is essentially just an example, and is not intended to limit the present disclosure, its applications, or its uses. Further, the drawings are schematic, and ratios of dimensions are different from the actual one.

First Embodiment

Figure 1:
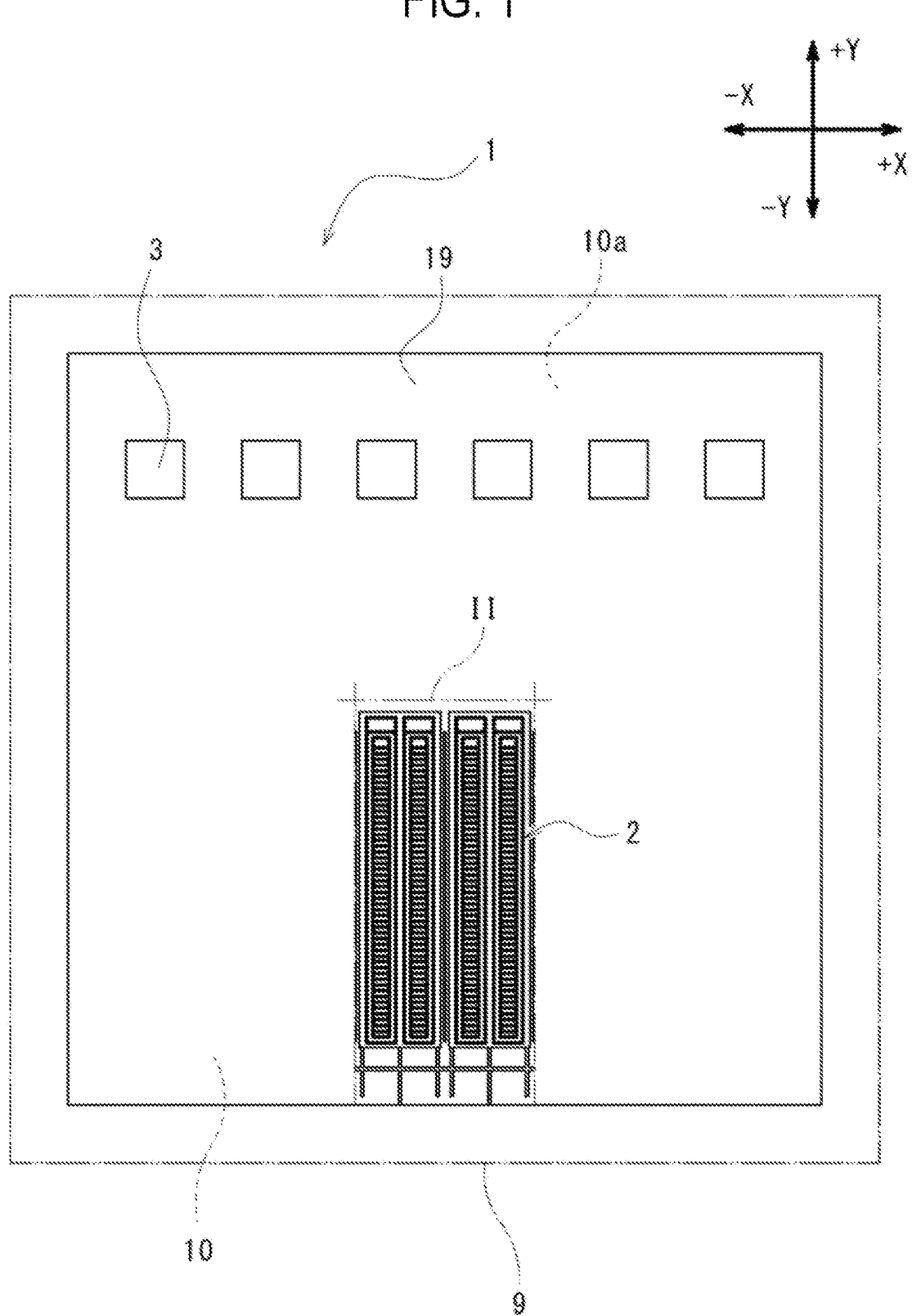
FIG. 1 is a plan view of a pressure sensor according to a first embodiment of the present disclosure.
Figure 2:
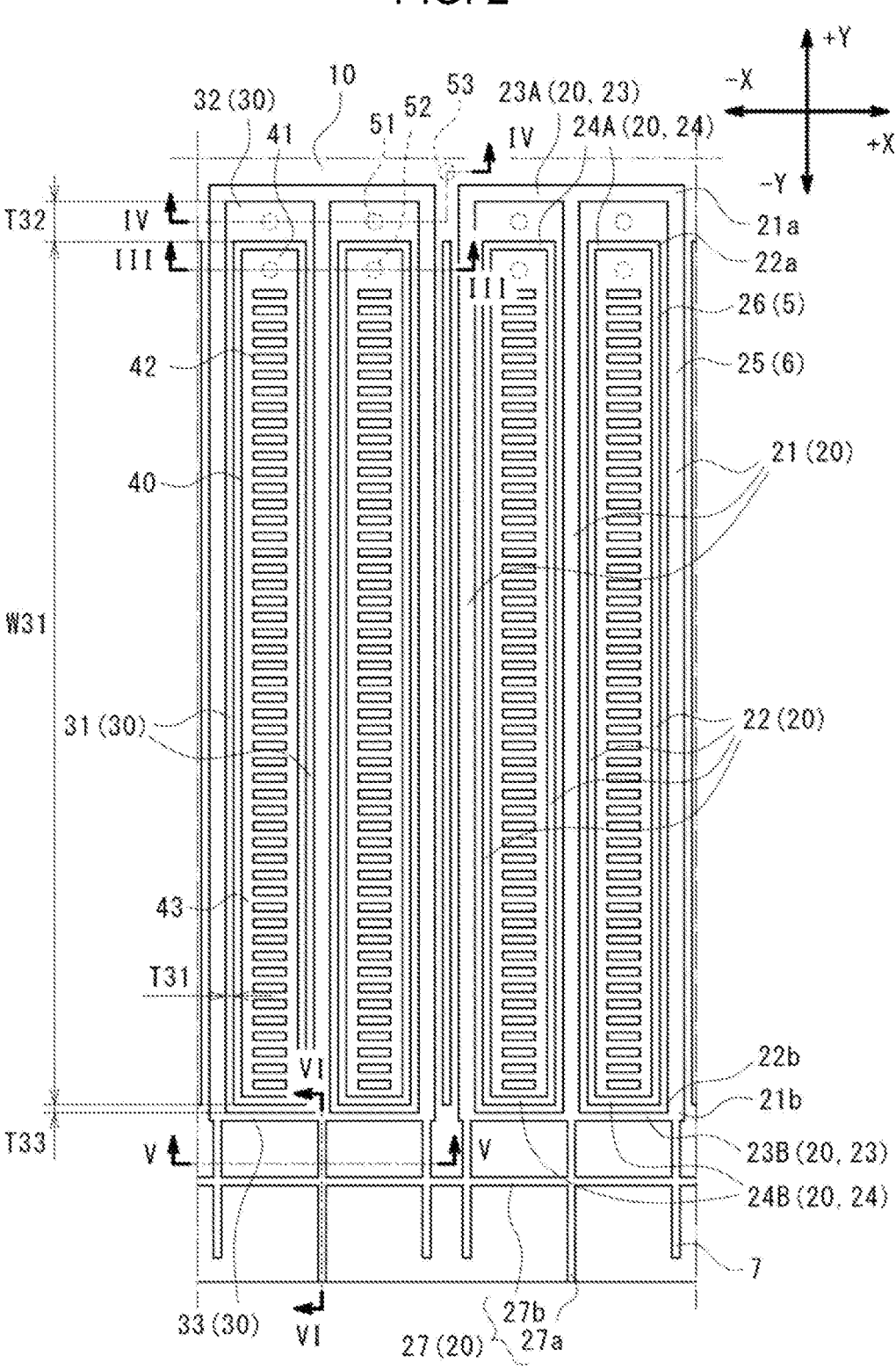
FIG. 2 is an enlarged view showing enlargement of a portion II of FIG. 1.

FIG. 1 is a plan view showing a pressure sensor 1 according to a first embodiment of the present disclosure. The pressure sensor 1 according to the present embodiment is a MEMS sensor manufactured by using a semiconductor micro-fabrication technology. In a portion II of FIG. 1, a sensor 2 configured inside the pressure sensor 1 is shown translucently. FIG. 2 is an enlarged view showing enlargement of the portion II of FIG. 1. Each of FIGS. 3 to 6 is a cross-sectional view of the MEMS sensor 1. As shown in FIGS. 1 to 6, the MEMS sensor 1 includes a substrate 10, a sensor 2 provided in the substrate 10, and electrode pads 3 configured to input/output electrical signals (voltages) to/from the sensor 2.

In the following description, for the sake of convenience, among directions along sides of the MEMS sensor 1 in plan views shown in FIGS. 1 and 2, a horizontal direction in FIG. 1 is referred to as an X direction, a vertical direction in FIG.

1 is referred to as a Y direction, and a thickness direction of the MEMS sensor 1 (the vertical direction in FIGS. 3 to 6) in cross-sectional views shown in FIGS. 3 to 6 is referred to as a Z direction. In particular, in FIGS. 1 and 2, a right side is referred to as a +X direction, a left side is referred to as a −X direction, an upper side is referred to as a +Y direction, and a lower side is referred to as a −Y direction. In FIGS. 3 to 6, an upper side is referred to as a +Z direction and a lower side is referred to as a −Z direction.

The substrate 10 is a rectangular parallelepiped component forming a main body of the MEMS sensor 1. The substrate 10 has a first main surface 10a located on the +Z side and a second main surface 10b (see FIG. 3) located on the −Z side and facing the first main surface 10a. The first main surface 10a and the second main surface 10b extend parallel to the X direction and the Y direction.

The sensor 2 will be described in detail with reference to FIG. 2. In the sensor 2, a groove 20 recessed from the first main surface 10a to the −Z side is formed in the substrate 10. A groove width of the groove 20 is, for example, 1.0 μm or more and 3.0 μm or less. A plurality of grooves 20 includes a plurality of first vertical grooves 21 extending in the Y direction, a plurality of second vertical grooves 22 extending in the Y direction and adjacent to the first vertical grooves 21 at a predetermined interval in the X direction, a plurality of first horizontal grooves 23 extending in the X direction from both ends 21a and 21b of the first vertical grooves 21 in the Y direction, and a plurality of second horizontal grooves 24 extending in the X direction from both ends 22a and 22b of the second vertical grooves 22 in the Y direction.

A +Y side end 21a of the first vertical groove 21 is located on the +Y side of a +Y side end 22a of the second vertical groove 22, and a −Y side end 21b of the first vertical groove 21 is located on the −Y side of the −Y side end portion 22b of the second vertical groove 22. Therefore, a +Y side first horizontal groove 23A provided on the +Y side is located on the +Y side of the corresponding +Y side second horizontal groove 24A, and a −Y side first horizontal groove 23B provided on the −Y side is located on the −Y side of the corresponding −Y side second horizontal groove 24B.

A pair of first vertical grooves 21 adjacent to each other in the X direction and a pair of first horizontal grooves 23 connected thereto and adjacent to each other in the Y direction form a first annular groove 25 extending in a quadrangular annular shape. Inside the first annular groove 25, a pair of second vertical grooves 22 adjacent to each other in the X direction and a pair of second horizontal grooves 24 connected thereto and adjacent to each other in the Y direction form a second annular groove 26 extending in a quadrangular annular shape.

In the substrate 10, the first annular groove 25 and the second annular groove 26 partition a movable electrode 30 extending in a quadrangular annular shape inside the first annular groove 25 and the second annular groove 26. Further, in the substrate 10, the second annular groove 26 partitions a quadrangular fixed electrode 40 formed inside the second annular groove 26.

Figure 3:
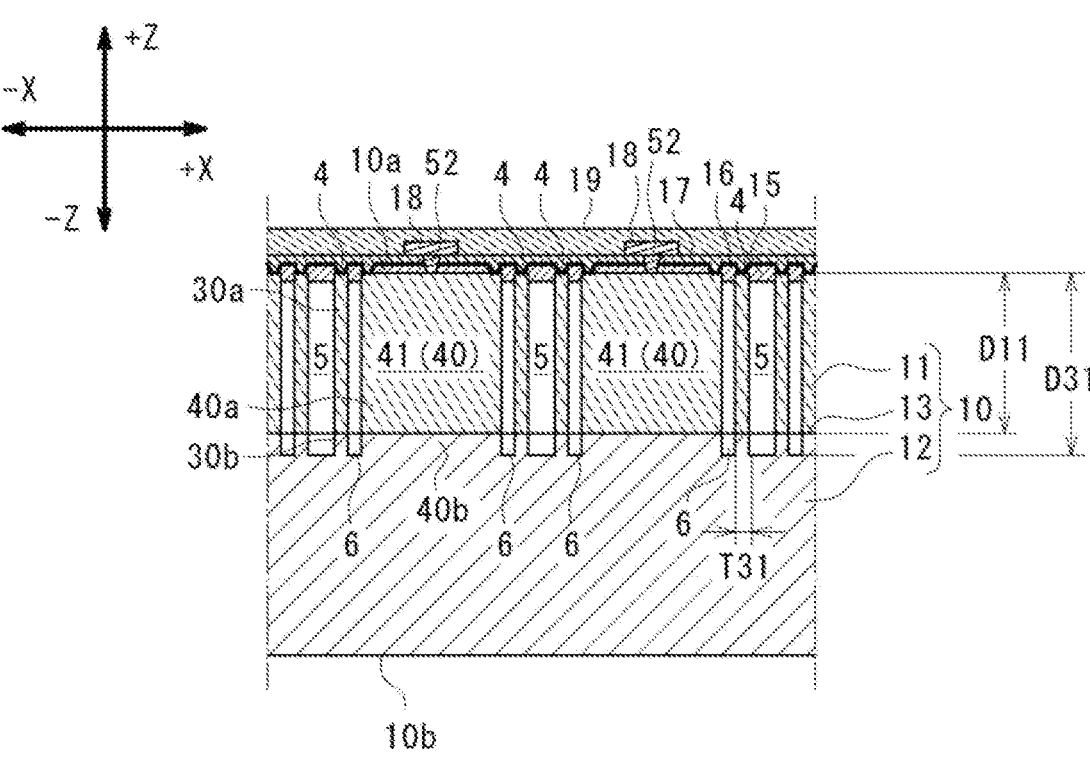
FIG. 3 is a cross-sectional view taken along line III-III in FIG. 2.

FIG. 3 is a cross-sectional view parallel to the Y and Z directions of each groove 20 and taken along line III-III in FIG. 2. As shown in FIG. 3, the substrate 10 has a first substrate 11 located near the first main surface 10a and a second substrate 12 located on a side of the first substrate 11 near the second main surface 10b. In this embodiment, the first substrate 11 is formed by epitaxially growing silicon doped with n-type impurities such as phosphorus at a high concentration (for example, $10^{18}$ to $10^{20}/cm^3$) on the +Z side surface of the second substrate 12. The second substrate 12 is a p-type semiconductor substrate obtained by doping p-type impurities such as boron into a silicon substrate. A thickness dimension D11 of the first substrate 11 in the Z direction is, for example, 40 μm or more and 60 μm or less.

A pn junction is formed on a junction surface 13 between the first substrate 11 and the second substrate 12. A reverse bias voltage is applied between the first substrate 11 and the second substrate 12 via the electrode pads 3 (see FIG. 1), and no current flows between the first substrate 11 and the second substrate 12.

Each groove 20 extends through the first substrate 11 in the Z direction to reach the second substrate 12, and terminates within the second substrate 12 at the −Z side end portion. As a result, the movable electrode 30 and the fixed electrode 40 partitioned by the groove 20 have first portions 30a and 40a formed by the first substrate 11 and second portions 30b and 40b formed by the second substrate 12, respectively.

As shown in FIG. 2, the movable electrode 30 has a pair of membranes 31 in the X direction each extending in the Y direction, a movable electrode wiring connection portion 32 connected to both +Y side end portions of the pair of membranes 31, and a link portion 33 that links both −Y side end portions of the pair of membranes 31 in the X direction.

The membrane 31 extends in a plane parallel to the Y and Z directions with a thickness direction of the membrane 31 being directed to the X direction. Referring to FIG. 3 together, the membrane 31 has a depth dimension D31 in the Z direction greater than a thickness dimension T31 in the X direction, and a width dimension W31 in the Y direction greater than the depth dimension D31. Therefore, the membrane 31 is configured in a rectangular shape elongated in the Y direction when viewed in the X direction.

In the present embodiment, the thickness dimension T31 of the membrane 31 is 1.0 μm or more and less than 3 μm, preferably 1.5 μm or more and less than 3.0 μm. In a case where the thickness dimension T31 of the membrane 31 is less than 1.5 μm, it is not easy to form the pair of grooves 20 with a separation distance of less than 1.5 μm so as to form the membrane 31. In a case where the thickness dimension T31 of the membrane 31 is 3 μm or more, it is difficult to ensure a deformability of the membrane 31. The depth dimension D31 of the membrane 31 is larger than the thickness D11 of the first substrate 11 and is, for example, 40 μm or more and 100 μm or less. A width dimension W1 of the membrane 31 is, for example, 200 μm or more and 600 μm or less. The size and number of membranes 31 may be appropriately set according to a detection sensitivity required for the MEMS sensor 1.

Figure 4:
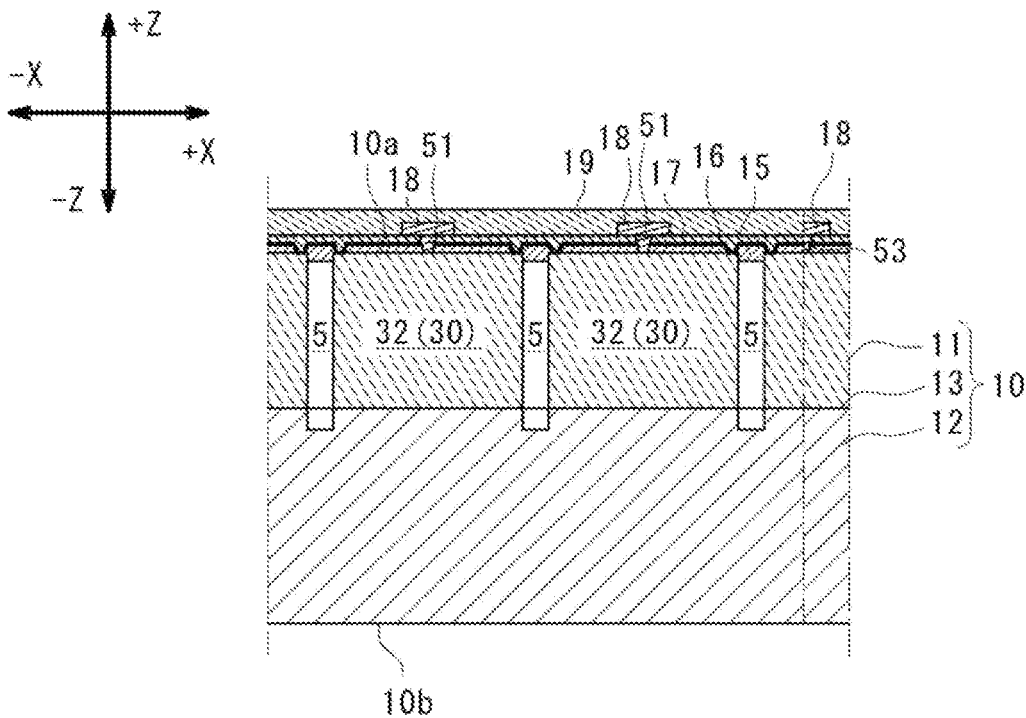
FIG. 4 is a cross-sectional view taken along line IV-IV in FIG. 2.

The movable electrode wiring connection portion 32 is configured in a rectangular shape elongated in the X direction when viewed in the Z direction. Referring to FIG. 4 together, the movable electrode wiring connection portion 32 is configured to have a size such that a first contact 51 configured to input/output an electric signal to/from the movable electrode 30 can be connected from the +Z side. The thickness dimension T32 of the movable electrode wiring connection portion 32 in the Y direction is larger than the thickness dimension T31 of the membrane 31. The link portion 33 extends in the X direction and has the thickness dimension T33 in the Y direction which is substantially the same as the thickness dimension T31 of the membrane 31.

The fixed electrode 40 is configured in a rectangular shape elongated in the Y direction when viewed in the Z direction and has a fixed electrode wiring connection portion 41 at the end portion on the Y1 side, and a plurality of lightening portions 42 that are recessed on the −Y side of the fixed electrode wiring connection portion 41 toward the −Z side and extend in the X direction.

The fixed electrode wiring connection portion 41 is configured in a rectangular shape elongated in the X direction when viewed in the Z direction. Referring to FIG. 3 together, the fixed electrode wiring connection portion 41 is configured to have a size such that a second contact 52 configured to input/output an electric signal to/from the fixed electrode 40 can be connected from the +Z side.

The plurality of lightening portions 42 are provided at regular intervals in the Y direction. The lightening portions 42 are provided in such a number and size that a rigidity of the fixed electrode 40, particularly a rigidity of a facing wall portion 43 thereof facing the movable electrode, is not lowered.

In the present embodiment, the movable electrode 30 and the fixed electrode 40 constitute a capacitor C. However, as described above, since the movable electrode 30 is configured so that the membrane 31 and the link portion 33, which constitute most of the movable electrode 30, are thin and the fixed electrode 40 is formed with the lightening portions 42, a parasitic capacitance of the capacitor C is reduced. By reducing the parasitic capacitance of the capacitor C, it is easy to detect a change in the capacitance of the capacitor C with high sensitivity.

The groove 20 further includes a third groove 27 that is in fluid communication with the first annular groove 25 with the outside of the substrate. A groove width of the third groove 27 is, for example, 1.5 μm or more and 3.0 μm or less, but the lower limit thereof may be 1.0 μm or more depending on etching conditions. The third groove 27 has a plurality of third vertical grooves 27a that are recessed on the −Z side from the substrate 10 and extend in the Y direction, and a plurality of third horizontal grooves 27b that intersect the plurality of third vertical grooves 27a and extend in the X direction.

Figure 5:
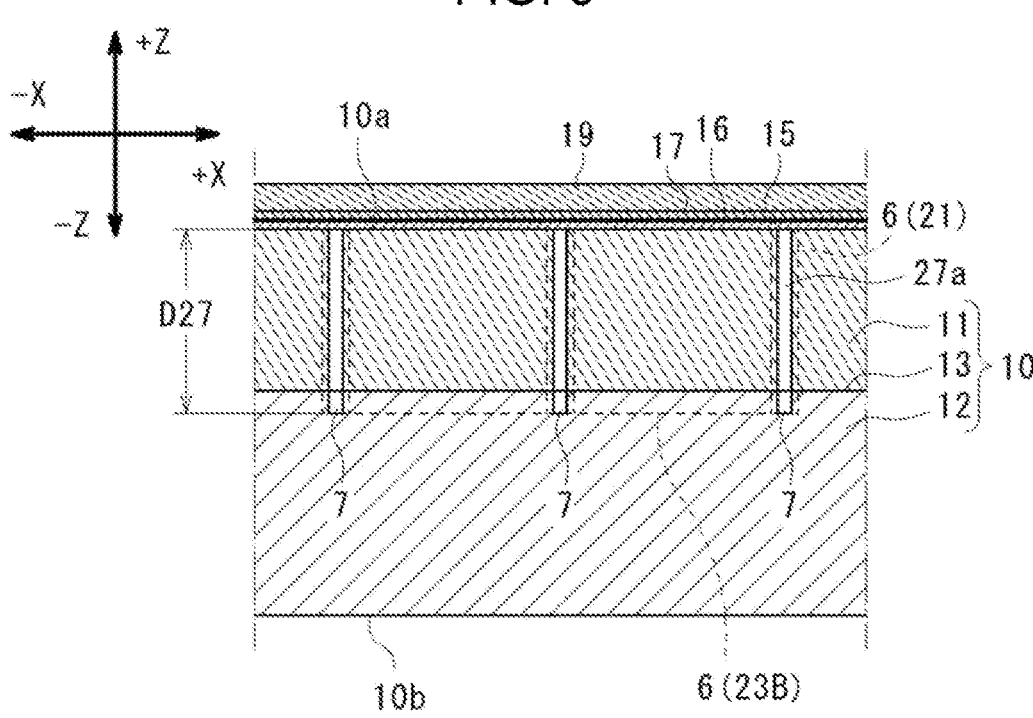
FIG. 5 is a cross-sectional view taken along line V-V in FIG. 2.
Figure 6:
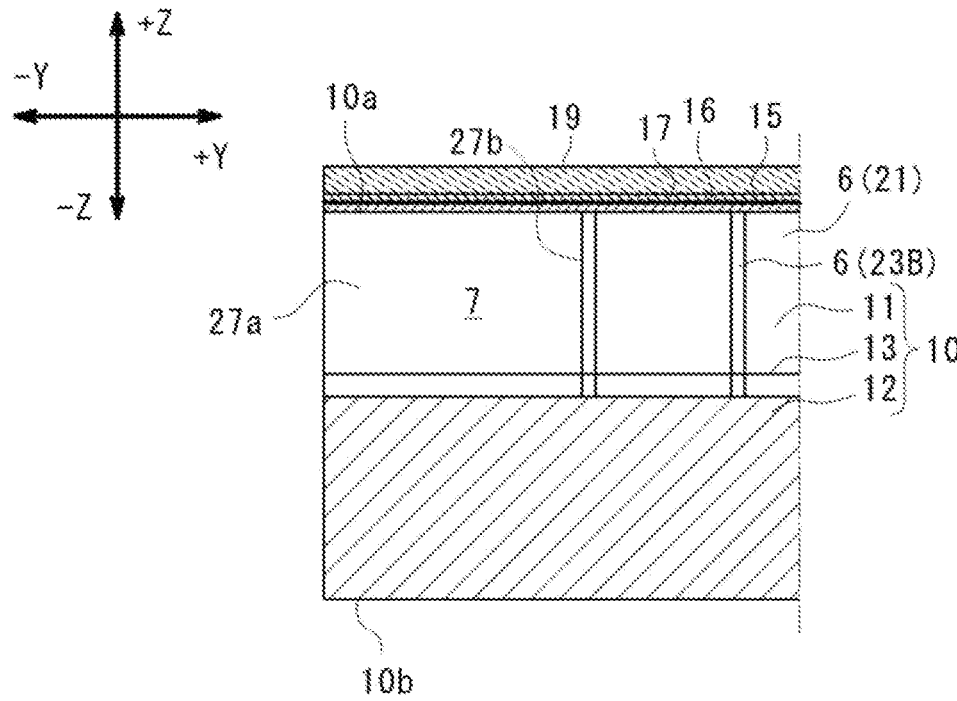
FIG. 6 is a cross-sectional view taken along line VI-VI in FIG. 2.

FIG. 5 is a cross-sectional view of the third vertical groove 27a in an X-Z direction taken along the line V-V in FIG. 2, and FIG. 6 is a cross-sectional view of the third horizontal groove 27b in a Y-Z direction taken along the line VI-VI in FIG. 2. As shown in FIGS. 5 and 6, the third groove 27 extends through the first substrate 11 in the Z direction and terminates within the second substrate 12. In the present embodiment, a groove depth D27 of the third groove 27 is substantially the same as the groove depth D21 of the first vertical groove 21. The third vertical groove 27a and the third horizontal groove 27b have the same depth.

As shown in FIG. 3, the substrate 10 has a closing layer 15 laminated on the first main surface 10a with a thickness of, for example, 2 μm or more and 5 μm or less. In the present embodiment, the closing layer 15 is silicon oxide. The closing layer 15 closes an opening of each groove 20 in the +Z direction on the first main surface 10a. A first chamber 5 is formed by the first annular groove 25 and the closing layer 15. A second chamber 6 is formed by the second annular groove 26 and the closing layer 15. Referring to FIG. 6 together, a fluid passage 7 is formed by the third groove 27 and the closing layer 15. The first chamber 5 is in fluid communication with the outside via the fluid passage 7. The second chamber 6 is configured as a space sealed from the outside. For example, the second chamber 6 is set in a substantially vacuum state.

Since the closing layer 15 is made of silicon oxide, it has air permeability, and it is difficult to ensure a sealability of the +Z direction opening of each groove 20 on the first main surface 10a. Therefore, in the present embodiment, a sealing layer 16 is further laminated on the +Z side of the closing layer 15. The sealing layer 16 enhances the sealability of the closing layer 15. Aluminum oxide or a multi-layer of aluminum oxide and titanium oxide may be used for the sealing layer 16.

Further, in order to enhance the sealability of the first chamber 5, the second chamber 6, and the fluid passage 7 on the first main surface 10a of the substrate 10, the sealing layer 16 is laminated directly on the first main surface 10a so as to surround the first chamber 5, the second chamber 6, and the fluid passage 7 along each groove 20. Therefore, the closing layer 15 does not exist in a portion where the sealing layer 16 is directly laminated. Accordingly, the sealing layer 16 is laminated in an uneven shape so that the portion directly laminated on the first main surface 10a is recessed toward the −Z side.

That is, the movable electrode 30 and the fixed electrode 40 are electrically insulated from each other by the closing layer 15 on the +Z side, and are electrically insulated from each other at the pn junction to which a reverse bias voltage is applied at a junction surface 13 between the first substrate 11 and the second substrate 12 on the −Z side. On the other hand, the first chamber 5 and the second chamber 6 are sealed by the sealing layer 16 on the +Z side so that a fluid does not flow between them.

In order to flatten the +Z side of the sealing layer 16 laminated in the uneven shape, a protective layer 17 is further laminated on the surface of the sealing layer 16 on the +Z side. The protective layer 17 is, for example, silicon oxide. The electrode pads 3 (see FIG. 1) and wiring layers 18 connected to the electrode pads 3 are further laminated on the flattened protective layer 17. The wiring layers 18 are electrically connected to the fixed electrode wiring connection portion 41 and the movable electrode wiring connection portion 32 (see FIG. 4), respectively, via the first contact 51 and the second contact 52 penetrating the closing layer 15, the sealing layer 16, and the protective layer 17 in the Z direction.

The electrode pad 3 and the wiring layer 18 may be, for example, an AlCu layer which is an alloy of aluminum and copper. For example, tungsten may be used for the first contact 51 and the second contact 52. The electrode pad 3, the wiring layer 18, the first contact 51, and the second contact 52 may be laminated on a lower layer via a barrier layer such as a Ti/TiN layer in which a Ti layer and a TiN layer are laminated.

Further, a passivation layer 19 is laminated on the +Z side of the protective layer 17 and the wiring layer 18 so that the electrode pads 3 are exposed on the Z1 side. For example, silicon oxide or silicon nitride may be used for the passivation layer 19.

In other words, according to the pressure sensor 1, the membrane 31 is deformed in the X direction due to a difference between a pressure of a fluid introduced into the first chamber 5 via the fluid passage 7 and an air pressure in the second chamber 6. As a result, a distance between membrane 31 and the fixed electrode 40 changes, and the capacitance of the capacitor C formed between the membrane 31 and the fixed electrode 40 changes. The pressure sensor 1 is configured to be capable of detecting the change in capacitance of the capacitor C and detecting the pressure of the fluid introduced from the fluid passage 7 into the first chamber 5 based on the detected change in capacitance.

Moreover, the membrane 31 is provided inside the pressure sensor 1 so as to extend in a plane (Y-Z plane) parallel to the lamination direction with its thickness being directed to the X direction, and does not extend perpendicular to the lamination direction (Z direction). As a result, since a lamination load, which may occur in the Z direction when the closing layer 15, the sealing layer 16, the protective layer 17, the wiring layer 18, and the passivation layer 19 are sequentially laminated on the substrate 10, acts on the membrane 31 in the in-plane direction, the lamination load is prevented from acting on the membrane 31 in a direction perpendicular to the plane.

Next, a method of manufacturing the pressure sensor 1 will be described with reference to FIGS. 7A to 7G. First, referring to FIG. 7A, the substrate 10 is formed by laminating the first substrate 11, which is an n-type epitaxial growth layer, by epitaxially growing silicon, which is heavily doped with n-type impurities such as phosphorus, to a thickness of, for example, 40 μm or more and 60 μm or less on the +Z side of the second substrate 12 which is a p-type silicon substrate doped with p-type impurities such as boron.

Figure 7A:
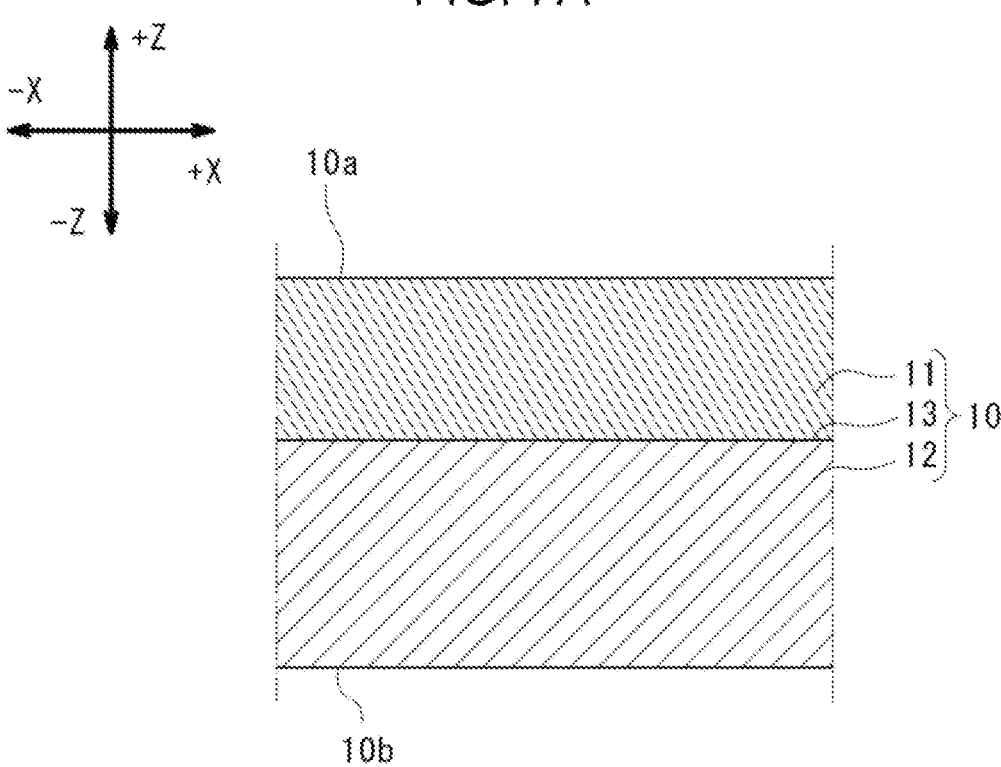
FIG. 7A is a view showing a part of a process of manufacturing the pressure sensor according to the first embodiment of the present disclosure.
Figure 7B:
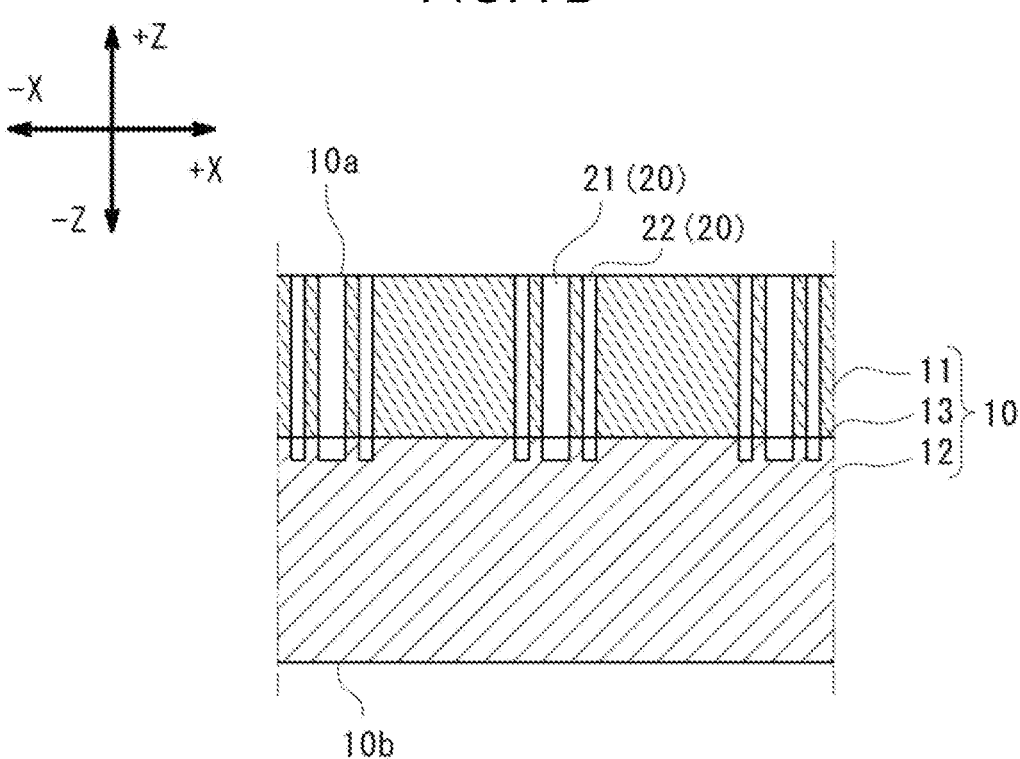
FIG. 7B is a view showing a next step of FIG. 7A.

Next, as shown in FIG. 7B, the grooves 20 recessed in the −Z direction from the first main surface 10a are formed in the substrate 10 by etching. Although details of the etching are omitted, for example, the grooves 20 may be formed by forming a mask having openings corresponding to the grooves 20 by photolithography and etching, and digging the substrate 10 in the −Z direction by anisotropic etching by using the mask. Each groove 20 is etched through the first substrate 11 in the Z direction to reach the second substrate 12 and terminate within the second substrate 12.

Figure 7C:
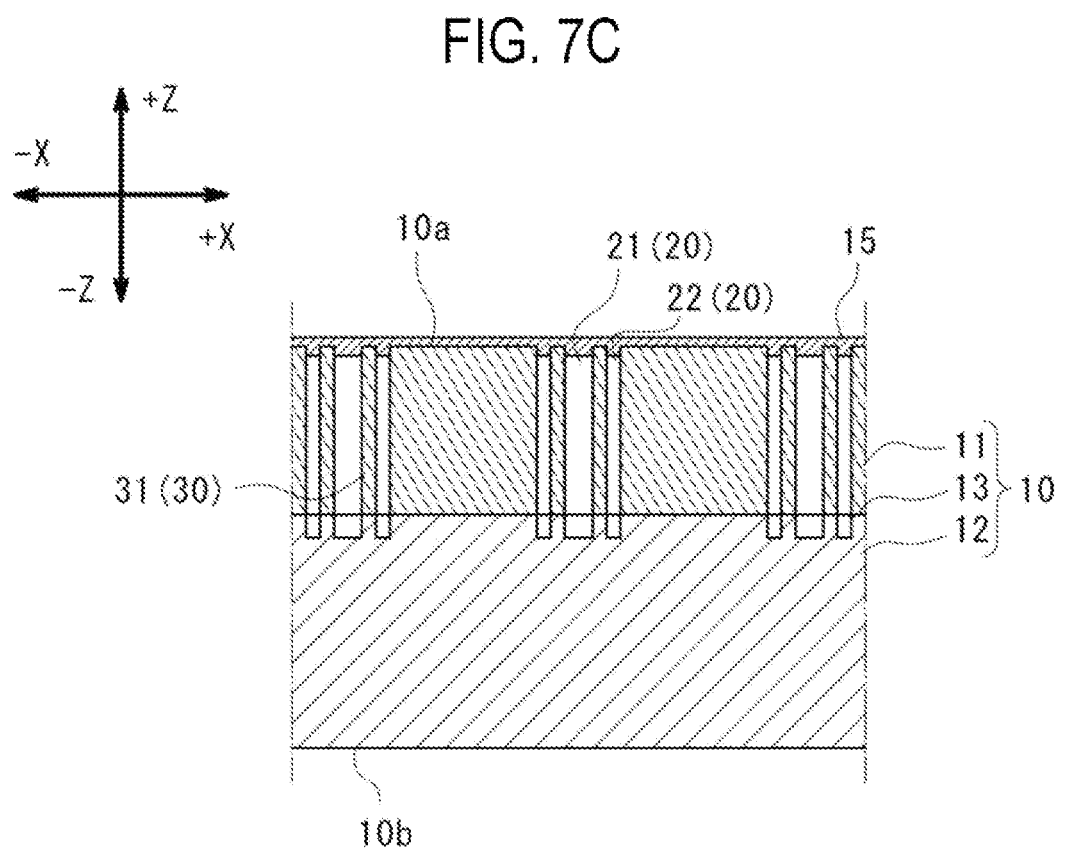

Next, as shown in FIG. 7C, the closing layer 15 is formed by laminating silicon oxide to a thickness of 2 μm or more and 5 μm or less on the first main surface 10a of the substrate 10 by PECVD (Plasma Enhanced Chemical Vapor Deposition). The closing layer 15 closes the opening of each groove 20 on the +Z side.

Figure 7D:
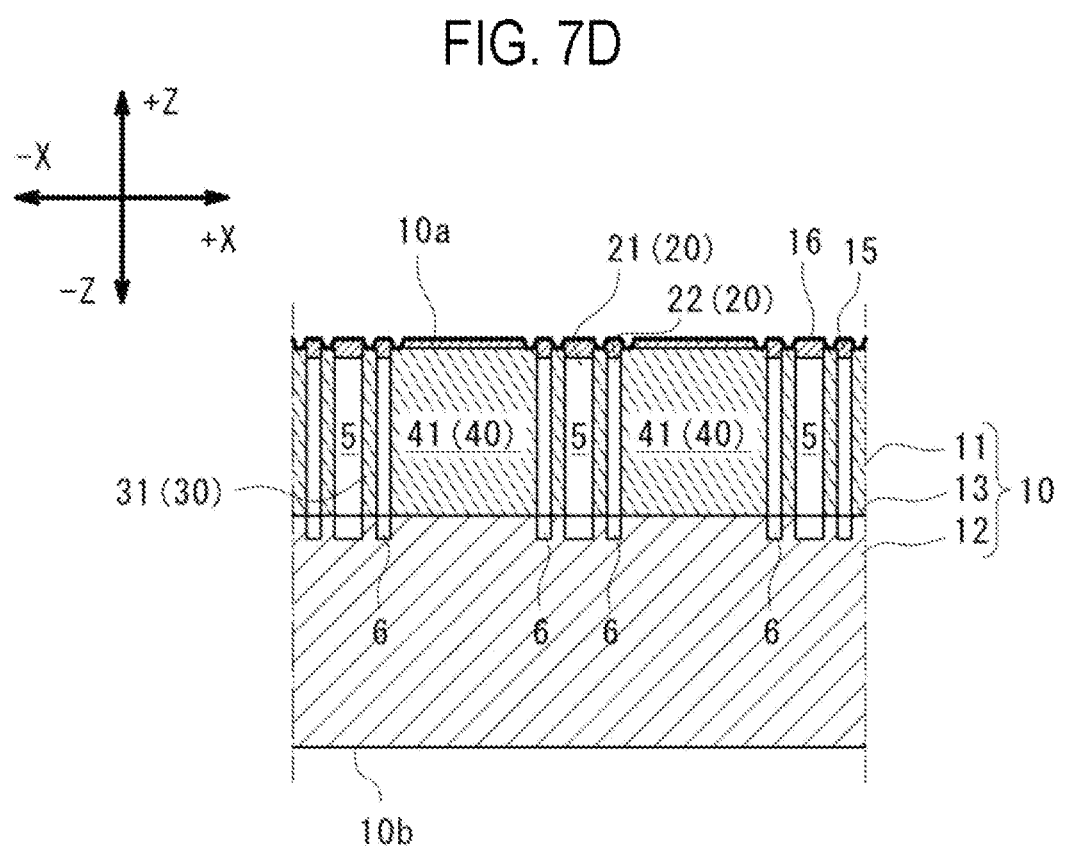

Next, as shown in FIG. 7D, the sealing layer 16 is formed by laminating aluminum oxide or a multi-layer of aluminum oxide and titanium oxide on the +Z side of the closing layer 15. The sealing layer 16 is laminated directly on the first main surface 10a along each groove 20 so as to surround the groove 20. Therefore, the closing layer 15 is removed in advance from a portion where the sealing layer 16 is directly laminated.

Figure 7E:
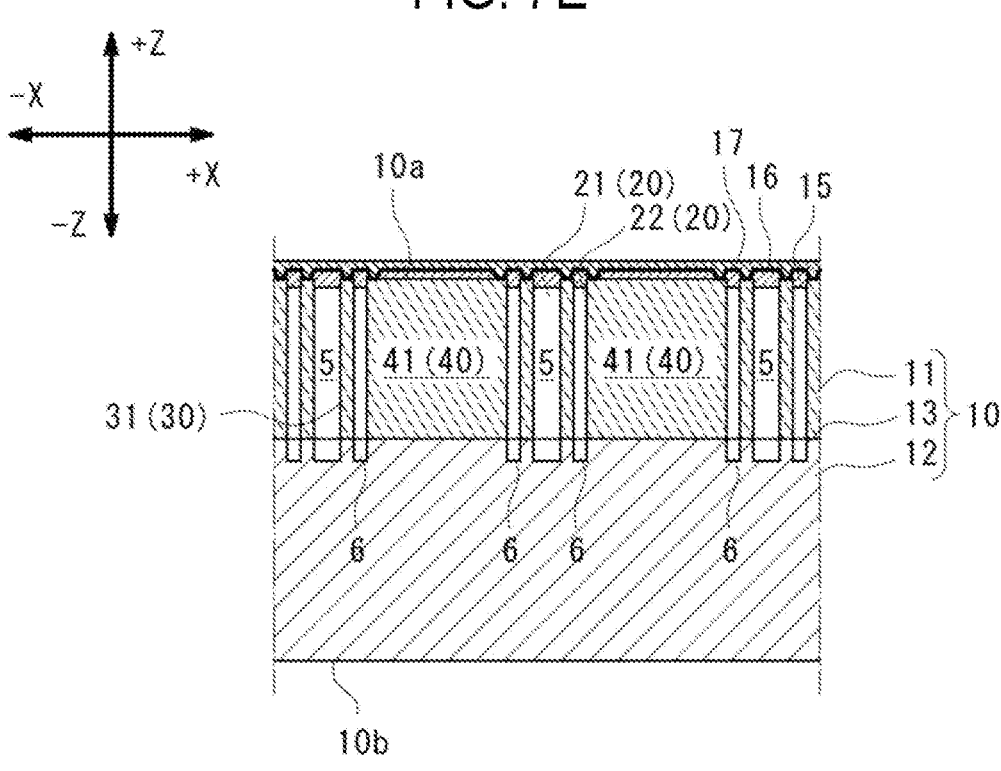
FIG. 7E is a view showing a next step of FIG. 7D.

Next, as shown in FIG. 7E, the protective layer 17 is formed by laminating silicon oxide on the +Z side of the sealing layer 16. An outer surface of the protective layer 17 on the +Z side is flattened by a CMP (Chemical Mechanical Polish) process.

Figure 7F:
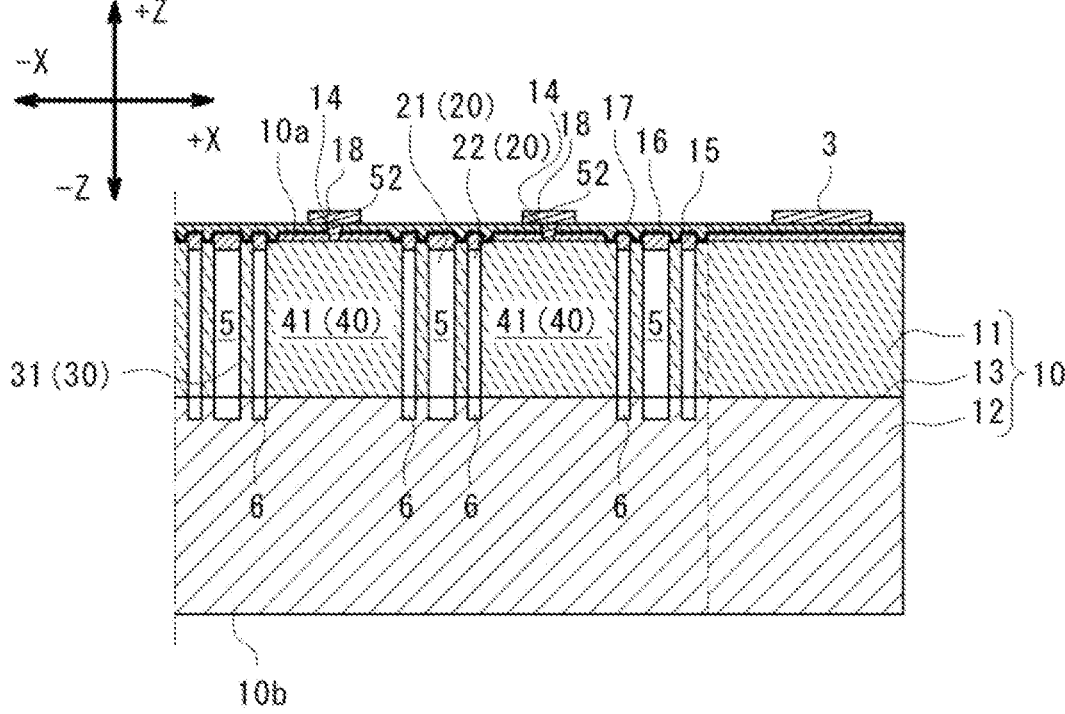
FIG. 7F is a view showing a next step of FIG. 7E.

Next, as shown in FIG. 7F, contact holes 14, which penetrate the closing layer 15, the sealing layer 16, and the protective layer 17 and reach the surfaces of the movable electrode 30 and the fixed electrode 40 on the +Z side, respectively, are formed by etching. Next, the contact holes 14 are filled with tungsten to form the first contact 51 and the second contact 52 (only the second contact 52 is shown in FIG. 7F). Next, the wiring layer 18 and the electrode pads 3 directly or indirectly connected to the first contact 51 and the second contact 52 are formed by patterning an AlCu layer on the +Z side of the protective layer 17. When forming the first contact 51, the second contact 52, and the wiring layer 18, they may be laminated on a lower layer via a barrier layer such as a Ti/TiN layer in which a Ti layer and a TiN layer are laminated.

Figure 7G:
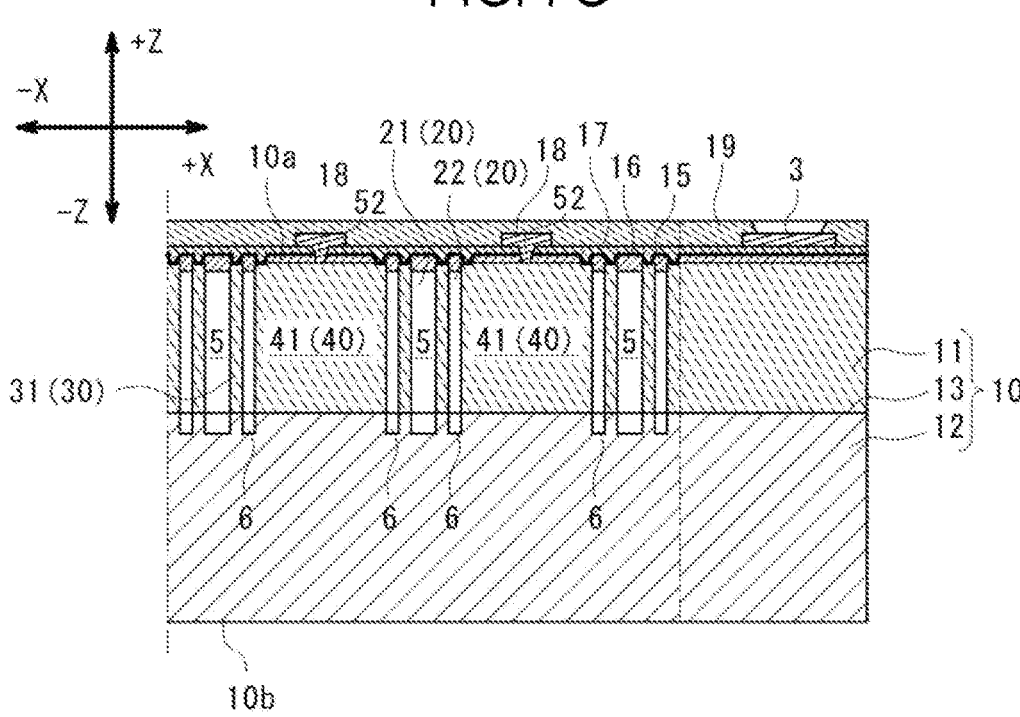
FIG. 7G is a view showing a next step of FIG. 7F.

Finally, as shown in FIG. 7G, the passivation layer 19 is formed by laminating silicon oxide so as to cover the protective layer 17 and the wiring layer 18 from the +Z side. The passivation layer 19 is laminated by using a mask so that the electrode pads 3 are exposed on the +Z side.

The pressure sensor 1 according to the above-described embodiment has the following effects.

(1) The pressure sensor 1 includes: the substrate 10 that has the first main surface 10a and the second main surface 10b facing the first main surface 10a and has a thickness in the Z direction where the first main surface 10a and the second main surface 10b face each other; the first chamber 5 that is recessed from the first main surface 10a to the −Z side with respect to the substrate 10; the second chamber 6 that is recessed from the first main surface 10a to the −Z side with respect to the substrate 10 and is adjacent to the first chamber 5 at an interval in the X direction; the fluid passage 7 that is recessed from the first main surface 10a to the −Z side with respect to the substrate 10 and causes the first chamber 5 to be in fluid communication with the outside; the closing layer 15 that is laminated on the first main surface 10a of the substrate 10 and closes openings of at least the first chamber 5 and the second chamber 6 on the first main surface 10a; and the membrane 31 that is partitioned by the first chamber 5 and the second chamber 6 in the substrate 10 between the first chamber 5 and the second chamber 6 in the X direction and extends in the plane parallel to the Y direction and the Z direction.

As a result, the pressure sensor 1 is formed by laminating a plurality of layers on the substrate 10 in the Z direction, and can detect an internal pressure of the first chamber 5 by electrically extracting a deformation of the membrane 31 provided between the first chamber 5 being in fluid communication with the outside and the second chamber 6 sealed from the outside, wherein the deformation is caused by a pressure difference between the first chamber 5 and the second chamber 6. Here, the membrane 31 is provided in such a posture that its thickness direction is oriented in a direction orthogonal to the laminating direction of the pressure sensor 1. As a result, a load in the laminating direction (Z direction), which may occur when the multi-layer is laminated on the substrate 10 during manufacturing of the pressure sensor 1, does not act on the membrane 31 in a direction perpendicular to the plane. Therefore, it is easy to suppress damage to the membrane 31 during manufacturing of the pressure sensor 1.

(2) The substrate 10 includes the first substrate 11 located near the first main surface 10a and the second substrate 12 located on the side of the first substrate 11 near the second main surface 10b, the first substrate 11 and the second substrate 12 are laminated to form a pn junction therebetween, a reverse bias voltage is applied between the first substrate 11 and the second substrate 12, and the membrane 31 is formed over the first substrate 11 and the second substrate 12. As a result, the membrane 31 may be electrically insulated from the fixed electrode 40 while extending from the first substrate 11 to the second substrate 12.

(3) The pressure sensor further includes the movable electrode wiring connection portion 32, which is partitioned by the first chamber 5 and the second chamber 6 with respect to the substrate 10, is electrically connected to the membrane 31, has a thickness dimension larger than that of the membrane 31, and extends over the first substrate and the second substrate. As a result, an electrical signal may be input to or extracted from the membrane 31, which is generally configured as a thin film, extends in a plane parallel to the Z direction and the Y direction and is configured to be thin when viewed in the Z direction, in the Z direction via the movable electrode wiring connection portion 32.

(4) The membrane 31 has the depth dimension D31 in the Z direction greater than the thickness dimension T31 in the X direction. As a result, since the pressure sensor 1 is configured such that the membrane 31 extends in the Z direction, the pressure sensor 1 may be easily made compact in the X direction.

(5) The membrane 31 has the thickness dimension T31 of 1.5 µm or more and less than 3 µm in the X direction. As a result, the membrane 31 is easily deformed in the X direction due to the pressure difference between the first chamber 5 and the second chamber 6, and a detectability of the pressure sensor 1 is easily ensured.

(6) The membrane 31 has the width dimension W31 in the Y direction greater than the depth dimension D31. As a result, since the membrane 31 is elongated in the Y direction, it is easy to deform the membrane 31 in the X direction due to the pressure difference between the first chamber 5 and the second chamber 6, and it is easy to ensure the detectability of the pressure sensor 1, while preventing the depth D31 of the first chamber 5 and the second chamber 6 from becoming excessively large.

(7) The pressure sensor further includes: the fixed electrode 40 that is partitioned on an opposite side of the membrane 31 by the second chamber 6 in the substrate 10 and faces the membrane 31 in the X direction; and the capacitor C including the membrane 31 and the fixed electrode 40. As a result, the deformation of the membrane 31 in the X direction may be detected as a change in capacitance in the capacitor C including the membrane 31 and the fixed electrode 40.

(8) The sealing layer 16 is further laminated on the +Z side of the closing layer 15. As a result, even when the closing layer 15 is made of, for example, silicon oxide with high air permeability, it is easy to secure the sealability at the openings of the first chamber 5 and the second chamber 6 on the first main surface 10a side by the further laminated sealing layer 16.

(9) The fluid passage 7 includes a plurality of paths being in fluid communication with the outside. As a result, since the fluid passage 7 includes the plurality of passages, even in a case where some of the passages are clogged, a fluid communication with the outside of the first chamber 5 may be easily secured by other passages.

(10) The fluid passage 7 is connected to the first chamber 5 at a plurality of points. As a result, since the fluid passage 7 is connected to the first chamber 5 at the plurality of points, even in a case where some of the connection portions are clogged, the fluid communication with the outside of the first chamber 5 may be easily secured by other connection portions.

(11) The pressure sensor 1 may be further wrapped with the resin 9, as indicated by a two-dot chain line in FIG. 1. As a result, the pressure sensor 1 may be easily and inexpensively protected by the resin 9. Specifically, since the membrane 31 does not appear parallel to the outer surface of the pressure sensor 1 directly or via another layer, even in a case where an outer periphery of the pressure sensor 1 is covered with the resin 9, damage to the membrane 31 due to the resin 9 is suppressed, the operation of the membrane 31 is not hindered, and the pressure sensor 1 may be protected at a lower cost compared to a case where the pressure sensor 1 is covered with a package.

(12) When viewed in the Z direction, the second chamber 6 extends so as to surround the fixed electrode 40, the membrane 31 extends to surround the second chamber 6, and the first chamber 5 extends to surround the membrane 31. As a result, the membrane 31 may be easily elongated, and the deformability of the membrane 31 may be easily ensured. Further, it is easy to increase the capacitance of the capacitor C including the membrane 31, and it is easy to improve the detectability of the pressure sensor 1.

In the above-described embodiment, the substrate 10 is configured such that the first substrate 11, which is an n-type silicon epitaxial growth layer, is laminated on the second substrate 12, which is a p-type silicon substrate, and a reverse bias voltage is applied to them. However, the present disclosure is not limited thereto. For example, the substrate 10 may be configured such that the first substrate, which is a p-type silicon substrate, is laminated on the second substrate, which is an n-type silicon substrate, and a reverse bias voltage is applied to them. In this case, the first substrate may be formed by epitaxially growing p-type silicon on the second substrate.

First Modification

FIGS. 8A to 8E show a method of manufacturing a pressure sensor 60 according to a first modification of the first embodiment of the present disclosure. The pressure sensor 60 according to the first modification is different from the pressure sensor 1 in that the former includes a closing layer 61 instead of the closing layer 15 and does not include the sealing layer 16. Other configurations are substantially the same as those of the pressure sensor 1. When manufacture the pressure sensor 60, the substrate 10 is first provided and each groove 20 is formed in the substrate 10, as in FIGS. 7A and 7B.

Figure 8A:
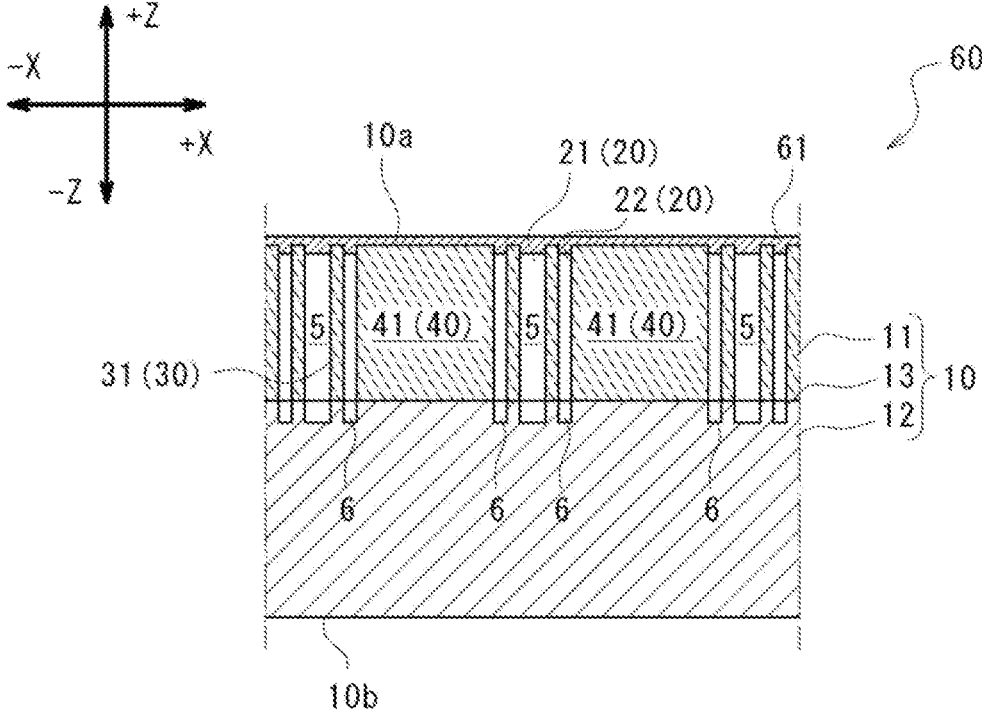
FIG. 8A is a view showing a part of a process of manufacturing a pressure sensor according to a modification of the present disclosure.

Next, as shown in FIG. 8A, after laminating amorphous n-type silicon doped with boron on the first main surface 10a of the substrate 10, the closing layer 61 is formed by heating the amorphous n-type silicon to a crystallization temperature to change the amorphous n-type silicon to polycrystalline n-type silicon or monocrystalline n-type silicon. The opening of each groove 20 on the +Z side is closed by the closing layer 61. Here, since the closing layer 61, which is the crystallized n-type silicon, is dense, each groove 20 may be sealed with the closing layer 61. Therefore, as described above, the sealing layer 16 is not necessary in this modification.

Figure 8B:
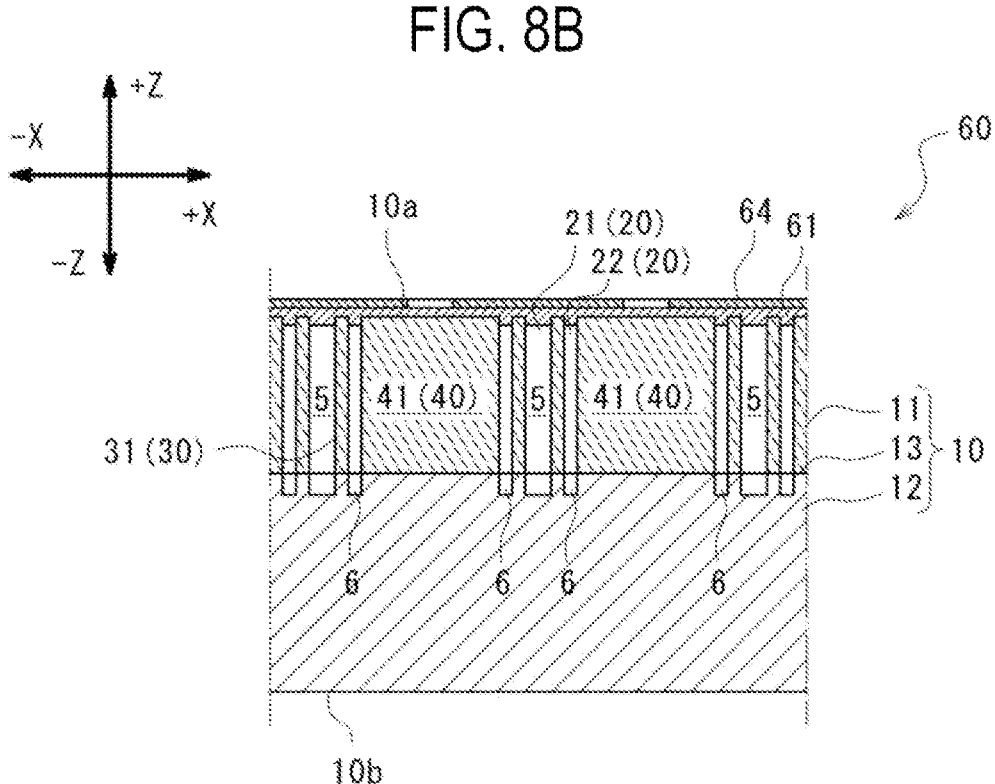
FIG. 8B is a view showing a next step of FIG. 8A.

Next, as shown in FIG. 8B, silicon oxide is laminated on the surface of the closing layer 61 on the +Z side, and the silicon oxide is photolithographed and etched to form a protective layer 64 having openings at positions corresponding to the movable electrode wiring connection portion 32 and the fixed electrode wiring connection portion 41.

Figure 8C:
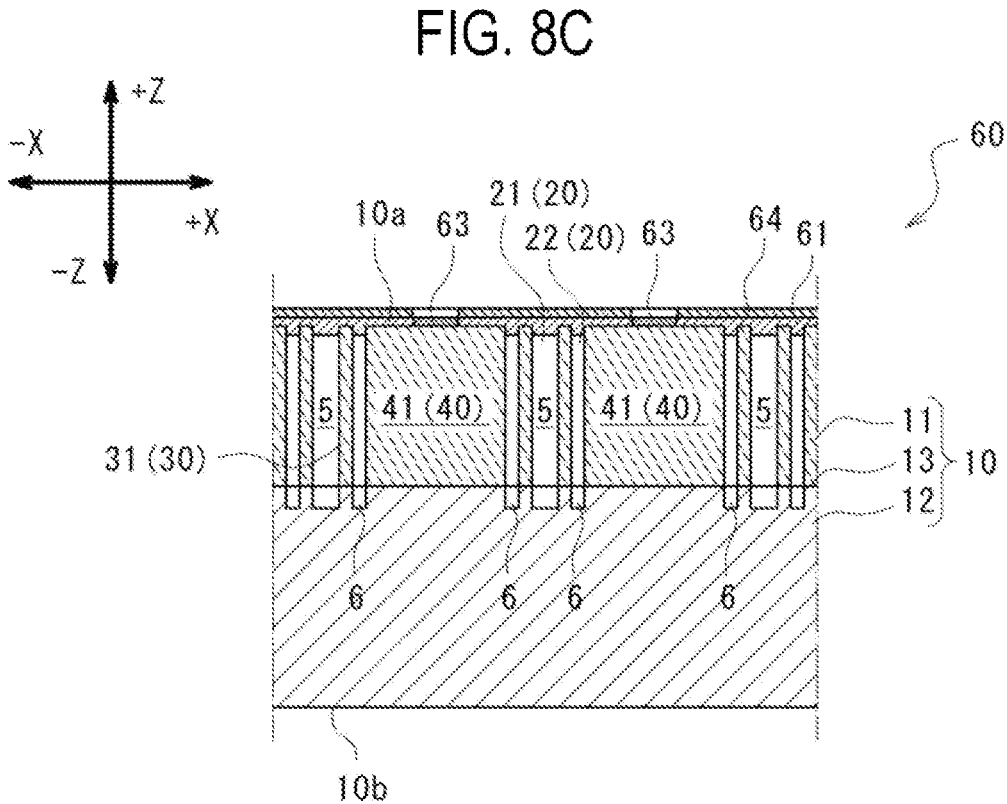
FIG. 8C is a view showing a next step of FIG. 8B.

Next, as shown in FIG. 8C, by using the protective layer 64 as a mask, n-type impurities such as phosphorus are implanted into the closing layer 61 at a high concentration, thereby forming a first contact 62 and a second contact 63 electrically connected to the movable electrode wiring connection portion 32 and the fixed electrode wiring connection portion 41, respectively (only the second contact 63 is shown in FIG. 8C).

Figure 8D:
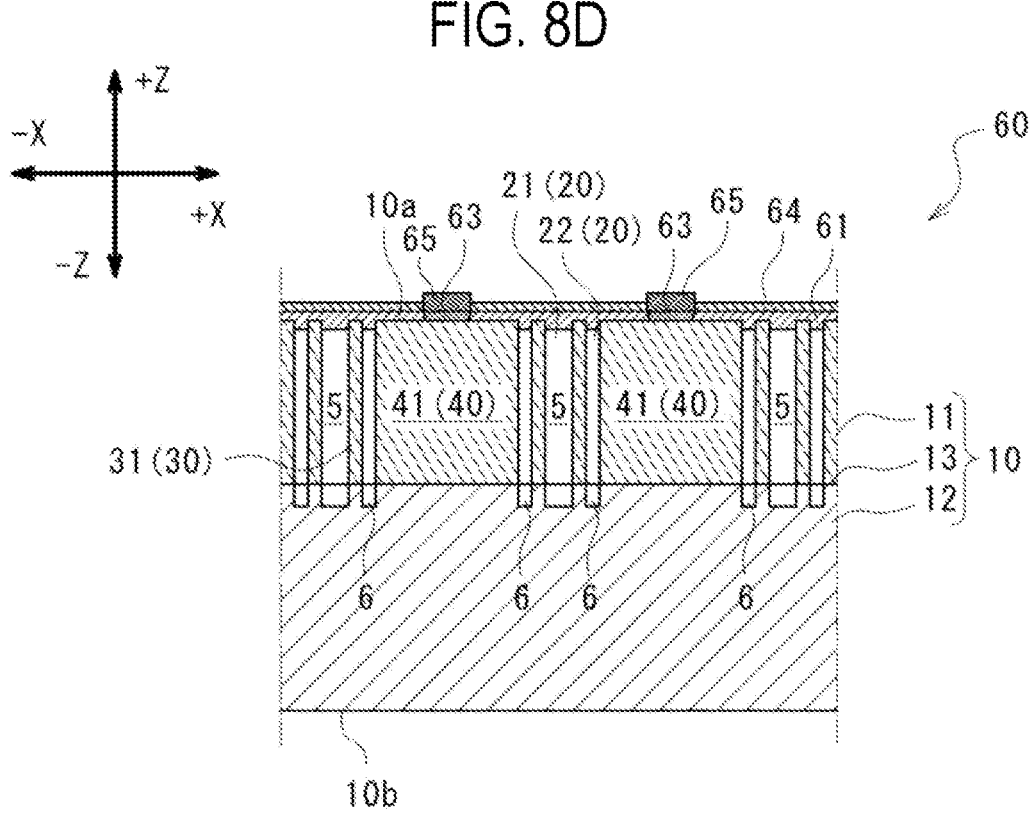
FIG. 8D is a view showing a next step of FIG. 8C.

Next, as shown in FIG. 8D, a wiring layer 65 and the electrode pads 3 are formed by patterning an AlCu layer from the +Z side of the protective layer 64 (only the wiring layer 65 is shown in FIG. 8D). The wiring layer 65 is also laminated on the first contact 62 and the second contact 63.

Figure 8E:
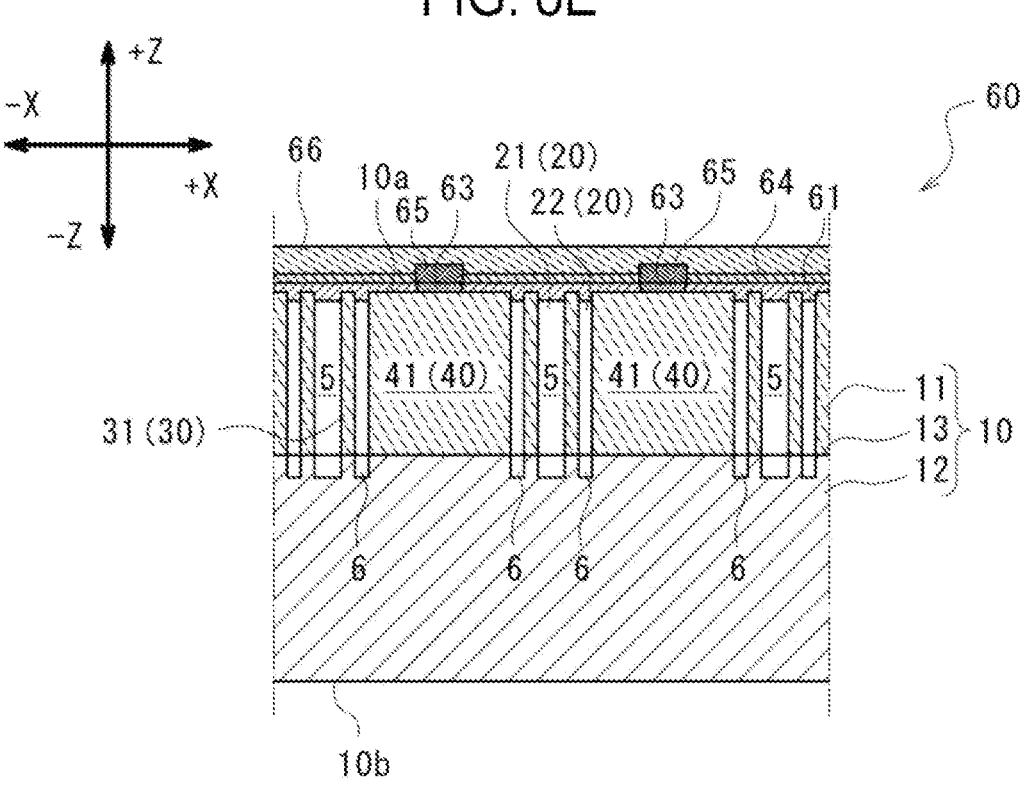
FIG. 8E is a view showing a next step of FIG. 8D.

Finally, as shown in FIG. 8E, a passivation layer 66 is formed by laminating silicon oxide so as to cover the protective layer 64 and the wiring layer 65 from the +Z side. The passivation layer 66 is laminated by using a mask such that the electrode pads 3 are exposed on the +Z side.

With the pressure sensor 60 according to the above-described first modification, since the closing layer 61 is made of monocrystalline n-type silicon or polycrystalline n-type silicon, which is denser than silicon oxide, the sealability of the opening of each groove 20 on the first main surface 10a side may be ensured even without an additional sealing layer 16. Further, by applying a reverse bias voltage between the closing layer 61 and the movable electrode 30/the fixed electrode 40, since a current can be prevented from flowing from the movable electrode 30 and the fixed electrode 40 to the closing layer 61, the movable electrode 30 and the fixed electrode 40 can be electrically insulated from each other on the +Z side.

Second Modification

Figure 9:
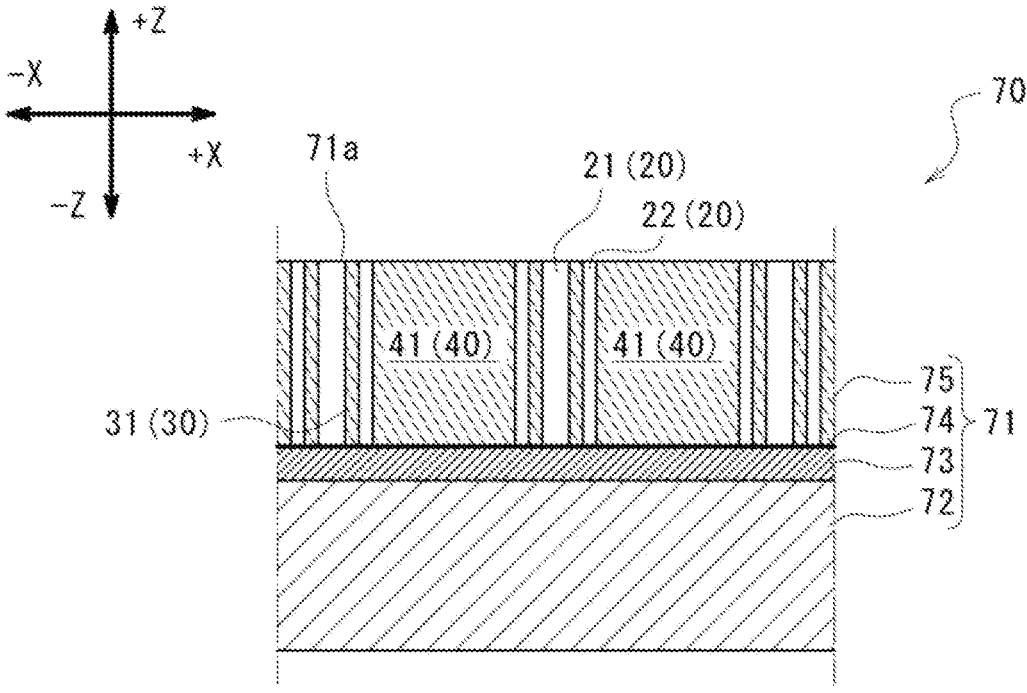
FIG. 9 is a view showing a substrate according to a modification of the present disclosure.

FIG. 9 shows a substrate 71 of a pressure sensor 70 according to a second modification of the first embodiment of the present disclosure. The pressure sensor 70 is different from the pressure sensor 1 in the configuration of the substrate 71. The other configurations are substantially the same as those in the pressure sensor 1, and therefore, the description of substantially the same parts is omitted, and only the substrate 71 will be described.

The substrate 71 includes a base substrate 72 made of silicon, an insulating layer 73 made of silicon oxide laminated on the +Z side of the base substrate 72, a sealing layer 74 made of aluminum oxide laminated on the +Z side of the insulating layer 73, and a first substrate 75 laminated on the +Z side of the sealing layer 74. The first substrate 75 may be formed by bonding a silicon substrate to the sealing layer 74, or may be formed by epitaxially growing polycrystalline silicon. In the substrate 71, each groove 20 is recessed from a first main surface 71a to the −Z side, penetrates the first substrate 75 in the Z direction, and terminates at the sealing layer 74.

Therefore, in the substrate 71, the movable electrode 30 and the fixed electrode 40 are electrically insulated from each other at the −Z side end portion by the insulating layer 73, and the sealability at the −Z side end portion of each groove 20 is ensured by the sealing layer 74. In other words, it is not necessary to insulate the first substrate 11 and the second substrate 12 by applying a reverse bias voltage to the pn junction between the first substrate 11 and the second substrate 12 as in the above-described embodiment.

Third Modification

Figure 10:
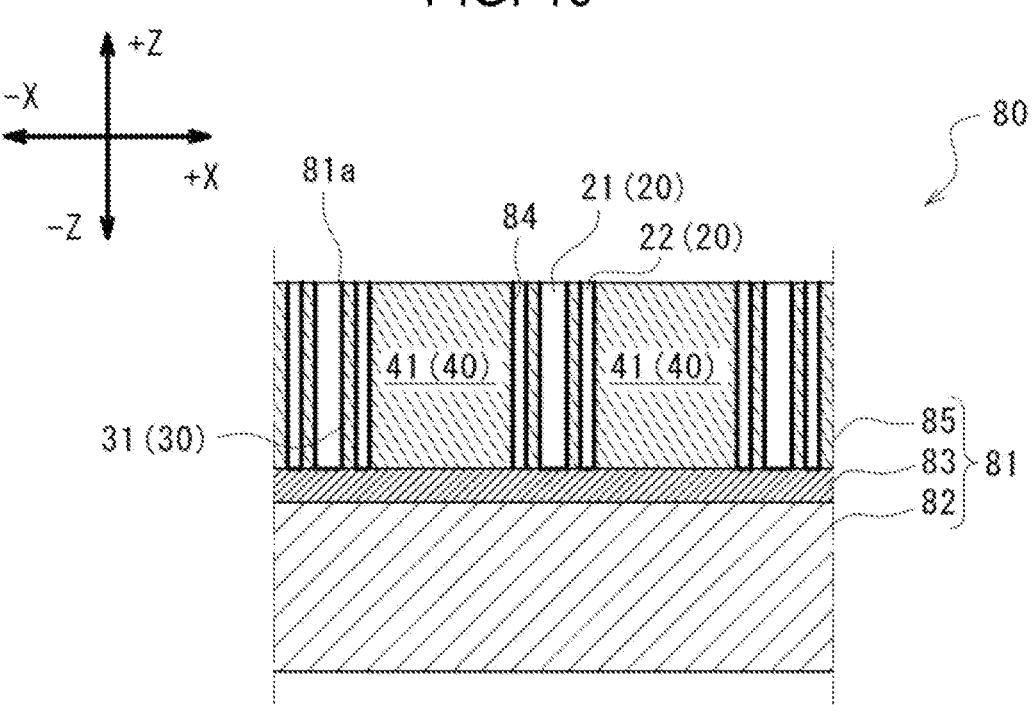
FIG. 10 is a view showing a substrate according to another modification of the present disclosure.

FIG. 10 shows a substrate 81 of a pressure sensor 80 according to a third modification of the first embodiment. The pressure sensor 80 is different from the pressure sensor 1 in the configuration of the substrate 81. Other configurations are substantially the same as those in the pressure sensor 1, and therefore, the description of substantially the same parts is omitted, and only the substrate 81 will be described.

The pressure sensor 80 is different from the pressure sensor 1 in the configuration of the substrate 81. Other configurations are the same as those in the pressure sensor 1, and therefore, the description thereof is omitted. The substrate 81 includes a base substrate 82 made of silicon, an insulating layer 83 made of silicon oxide laminated on the +Z side of the base substrate 82, and a first substrate 85 laminated on the +Z side of the insulating layer 83. In the substrate 81, each groove 20 is recessed from the first main surface 81a to the −Z side, penetrates the first substrate 85 in the Z direction, and terminates at the insulating layer 83. Further, a sealing layer 84 is formed on the inner surface of each groove 20 by laminating aluminum oxide.

Therefore, in the substrate 81, the movable electrode 30 and the fixed electrode 40 are electrically insulated from each other at the −Z side end portion by the insulating layer 83, and the sealability at the −Z side end portion of each groove 20 is ensured by the sealing layer 84. In other words, it is not necessary to insulate the first substrate 11 and the second substrate 12 by applying a reverse bias voltage at the pn junction between the first substrate 11 and the second substrate 12 as in the second modification.

Fourth Modification

Figure 11:
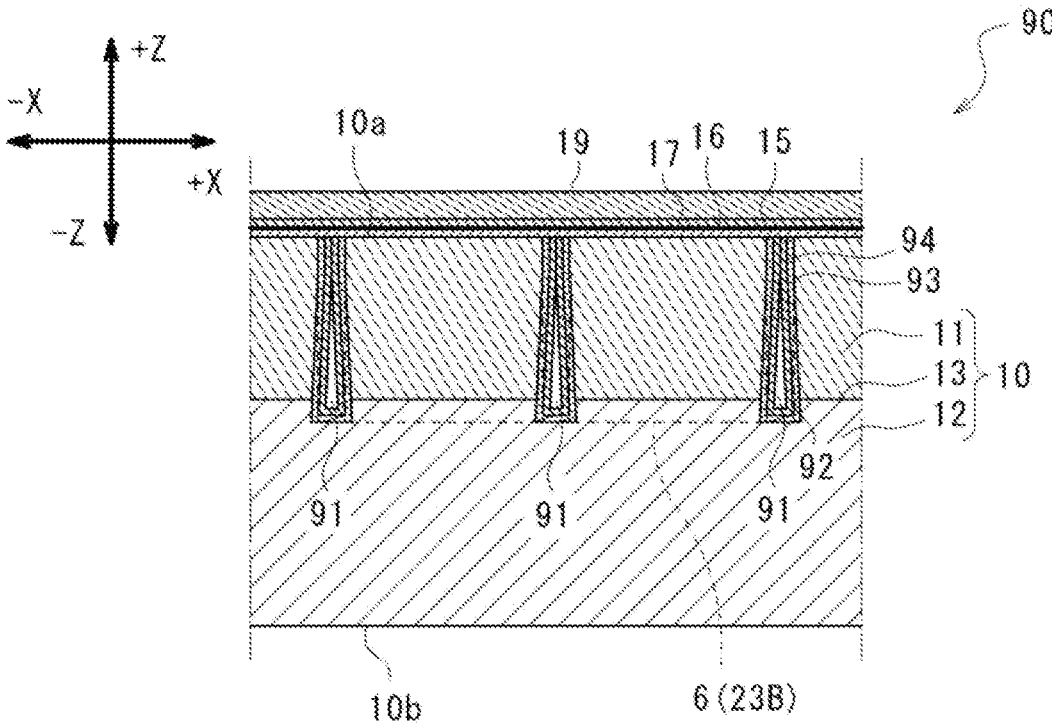
FIG. 11 is a cross-sectional view, which is similar to that taken along the line V-V, showing a fluid passage according to a modification of the present disclosure.

FIG. 11 shows a cross section of a pressure sensor 90 according to a fourth modification of the first embodiment, which corresponds to FIG. 5. The pressure sensor 90 includes a fluid passage 91 different from that of the above-described embodiment. Other configurations are substantially the same as those in the pressure sensor 1, and therefore, the description of substantially the same parts is omitted, and only the fluid passage 91 will be described.

The fluid passage 91 is formed by forming a silicon oxide layer 93 on a groove wall surface of a third groove 92 by thermally oxidizing the groove wall surface, and blocking a mouth of the third groove 92 on the first main surface 10a side by a silicon layer 94 formed by laminating polycrystalline silicon on the surface of the silicon oxide layer 93. In a case where the mouth of the third groove 92 can be blocked by laminating the silicon oxide layer 93, the silicon layer 94 may not be laminated.

Although not shown, after the fluid passage 91 is formed, the remaining grooves 20 may be formed so as to be in fluid communication with the fluid passage 91 in the Y direction in a state where the +Y side end portion of the fluid passage 91 is opened.

Fifth Modification

Figure 12:
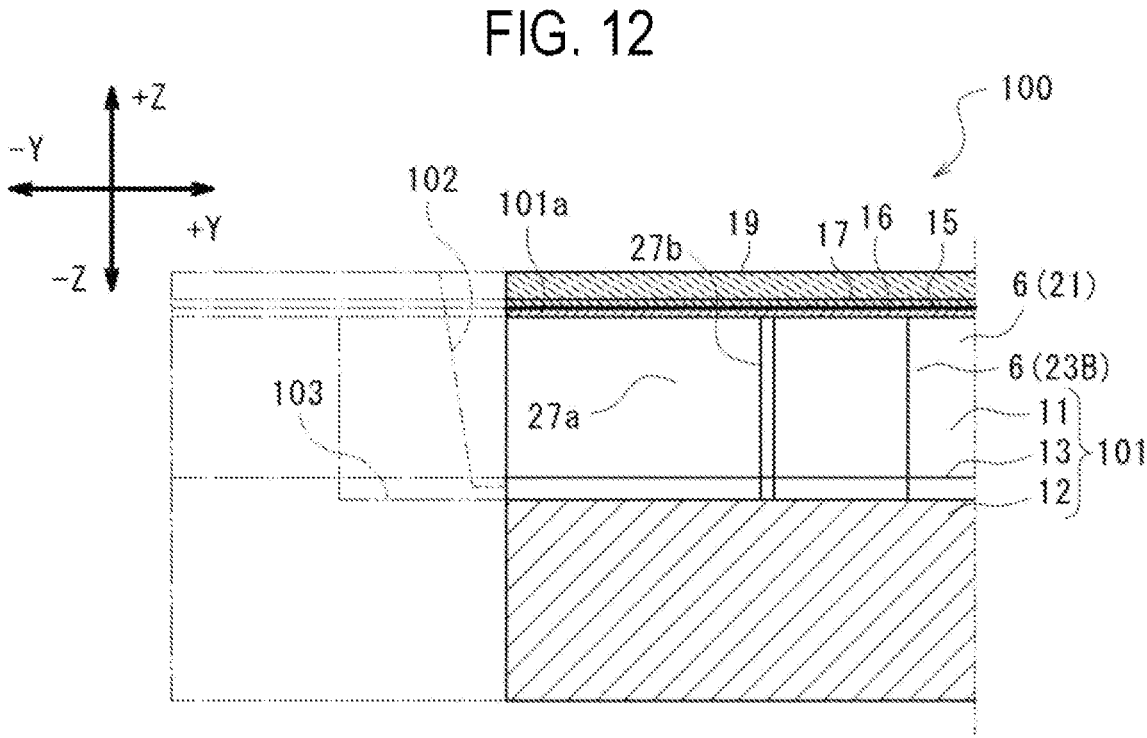
FIG. 12 is a cross-sectional view, which is similar to that taken along the line VI-VI, showing a fluid passage according to a modification of the present disclosure.

FIG. 12 shows a cross section of a pressure sensor 100 according to a fifth modification, which corresponds to FIG. 6. In FIG. 12, a substrate 101 before dicing is indicated by a two-dot chain line. In a state before dicing the substrate 101, the substrate 101 includes a notch 102 for dicing that is recessed from a first main surface 101a to the −Z side and extends in the X direction, and a fluid passage 103 that extends to the −Y side beyond the notch 102. The fluid passage 103 terminates at a position spaced apart from the −Y side end face of the substrate 101.

In the substrate 101, the fluid passage 103 is configured to be in fluid communication with the outside by dicing. In other words, since foreign substances are suppressed from being mixed into the fluid passage 103 before dicing, clogging of the fluid passage 103 is easily suppressed, and the detectability of the pressure sensor 100 is easily secured.

Second Embodiment

Figure 13:
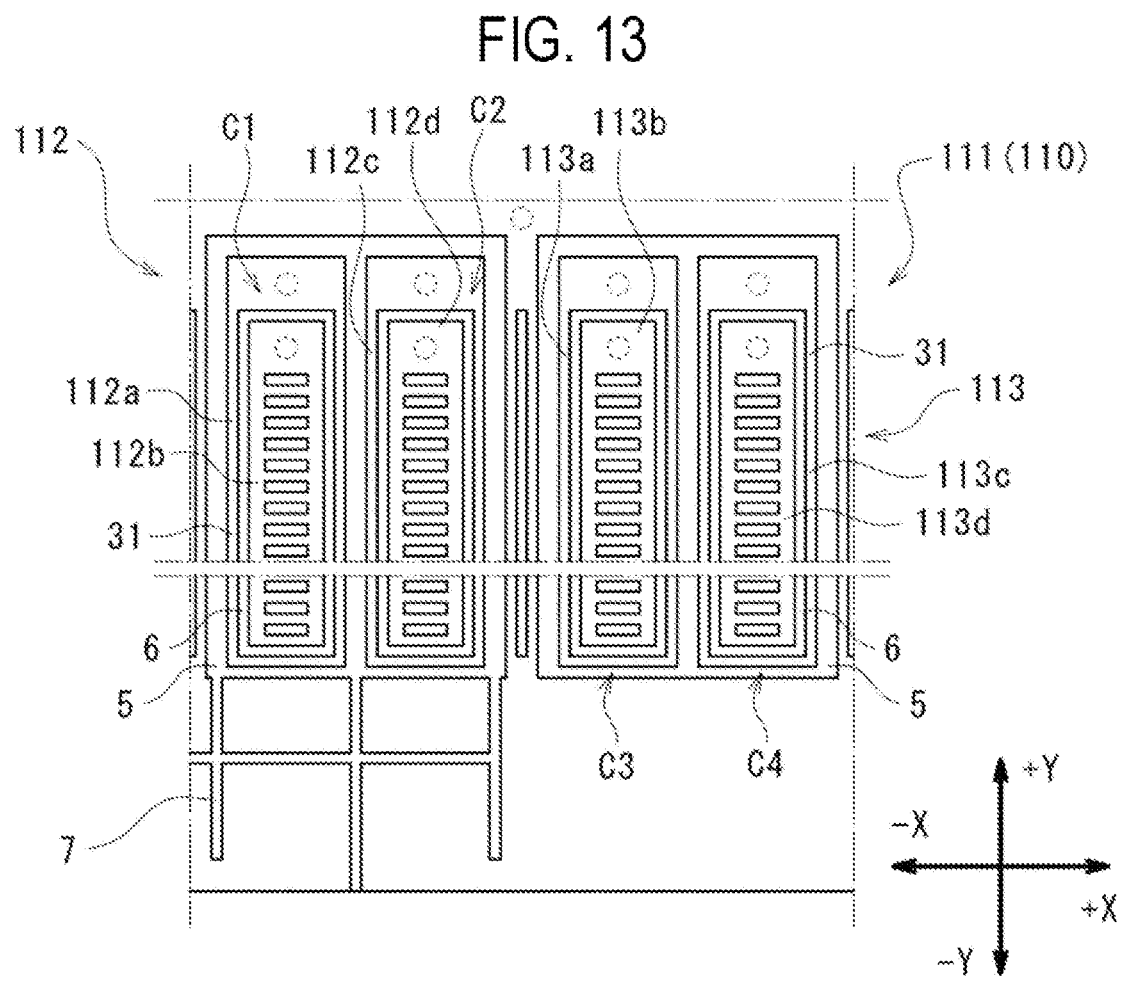

FIG. 13 shows a sensor 111 of a pressure sensor 110 according to a second embodiment of the present disclosure. As shown in FIG. 13, the sensor 111 includes a first sensor 112 configured similarly to the first embodiment and a second sensor 113 that is not connected to the fluid passage 7.

The first sensor 112 includes a first capacitor C1 including a quadrangular annular first movable electrode 112a and a first fixed electrode 112b located inside the quadrangular annular first movable electrode 112a, and a second capacitor C2 including a quadrangular annular second movable electrode 112c and a second fixed electrode 112d located inside the quadrangular annular second movable electrode 112c.

The second sensor 113 includes a third capacitor C3 including a quadrangular annular third movable electrode 113a and a third fixed electrode 113b located inside the quadrangular annular third movable electrode 113a, and a fourth capacitor C4 including a quadrangular annular fourth movable electrode 113c and a fourth fixed electrode 113d located inside the quadrangular annular fourth movable electrode 113c.

Capacitances of the first capacitor C1 and the second capacitor C2 change due to deformation of the membrane 31 in the X direction caused by a pressure difference between a pressure of fluid introduced into the first chamber 5 from the fluid passage 7 and a pressure of the second chamber 6. Specifically, when the pressure of the first chamber 5 is higher than the pressure of the second chamber 6, the capacitances of the first capacitor C1 and the second capacitor C2 increase. On the other hand, since the first chamber 5 is not connected to the fluid passage 7, the capacitances of the third capacitor C3 and the fourth capacitor C4 have a constant value while the membrane 31 is not deformed. The pressure sensor 110 combines the first to fourth capacitors C1 to C4 and is configured to detect a change in capacitance in the first capacitor C1 and the second capacitor C2.

Figure 14:
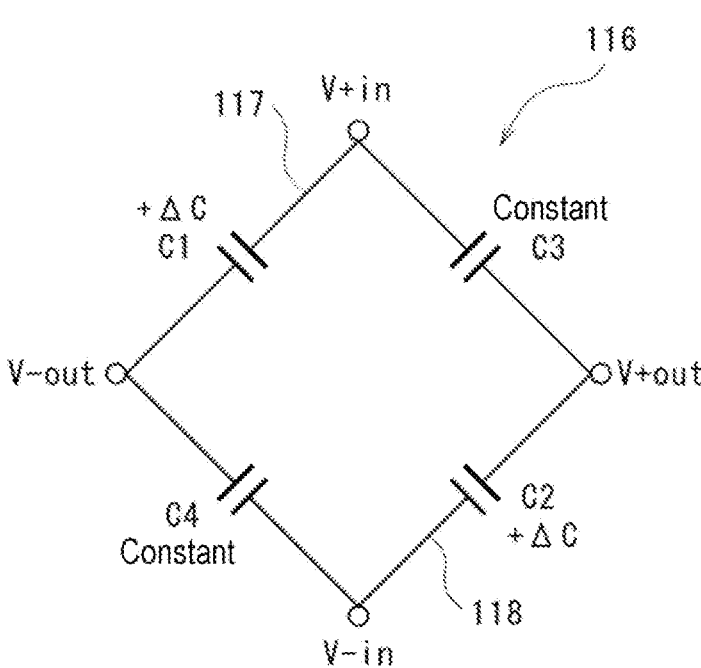
FIG. 14 is an equivalent circuit diagram of the pressure sensor of FIG. 13.

FIG. 14 is an equivalent circuit diagram of a circuit 116 in which the first to fourth capacitors C1 to C4 are combined to form a Wheatstone bridge circuit. In the circuit 116, a first circuit 117 in which the first capacitor C1 and the fourth capacitor C4 are connected in series in this order and a second circuit 118 in which the third capacitor C3 and the second capacitor C2 are connected in series in this order are connected in parallel.

When a drive voltage V+ in is applied to one end of the circuit 116 and a drive voltage V− in is applied to the other end of the circuit 116, the circuit 116 detects a potential difference between a potential V− out between the first capacitor C1 and the fourth capacitor C4 in the first circuit 117 and a potential V+ out between the third capacitor C3 and the second capacitor C2 in the second circuit 118. Based on the detected potential difference, the deformation of the membrane 31 in the first sensor 112 may be calculated, and the pressure of the fluid that is introduced from the outside into the fluid passage 7 may be calculated based on the calculated deformation of the membrane 31.

Third Embodiment

Figure 15:
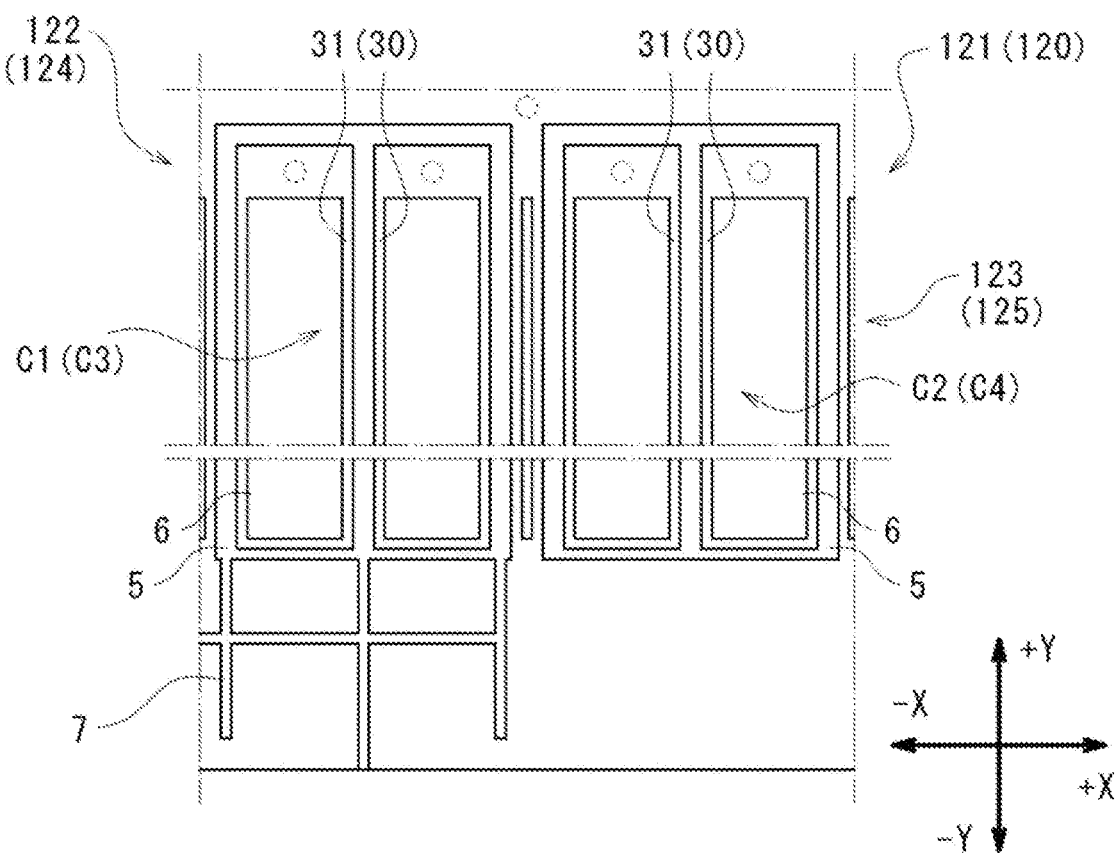
FIG. 15 is a plan view showing a sensor of a pressure sensor according to a third embodiment of the present disclosure.

FIG. 15 shows a sensor 121 of a pressure sensor 120 according to a third embodiment of the present disclosure. As shown in FIG. 15, the sensor 121 includes a first sensor 122 and a second sensor 123. The first sensor 122 includes a pair of movable electrodes 30 in the X direction, but is different from the sensor 2 of the first embodiment in that the first sensor 122 does not include a fixed electrode. On the other hand, the second sensor 123 is different from the first sensor 122 in that the second sensor 123 is not connected to the fluid passage 7.

In the first sensor 122, a pair of membranes 31 adjacent to each other in the X direction constitutes a first capacitor C1. In the second sensor 123, a pair of membranes 31 adjacent to each other in the X direction constituted a second capacitor C2. The sensor 121 includes a third sensor 124 that is configured similarly to the first sensor 122 and includes a third capacitor C3, and a fourth sensor 125 that is configured similarly to the second sensor 123 and includes a fourth capacitor C4.

Capacitances of the first capacitor C1 and the second capacitor C2 change due to deformation of the membrane 31 in the X direction caused by a pressure difference between a pressure of fluid introduced into the first chamber 5 from the fluid passage 7 and a pressure of the second chamber 6. Specifically, when the pressure of the first chamber 5 is higher than the pressure of the second chamber 6, the capacitances of the first capacitor C1 and the third capacitor C3 increase. On the other hand, since the first chamber 5 is not connected to the fluid passage 7, the capacitances of the second capacitor C2 and the fourth capacitor C4 have a constant value while the membrane 31 is not deformed. The pressure sensor 120 combines the first to fourth capacitors C1 to C4 and is configured to detect a change in capacitance in the first capacitor C1 and the third capacitor C3.

Figure 16:
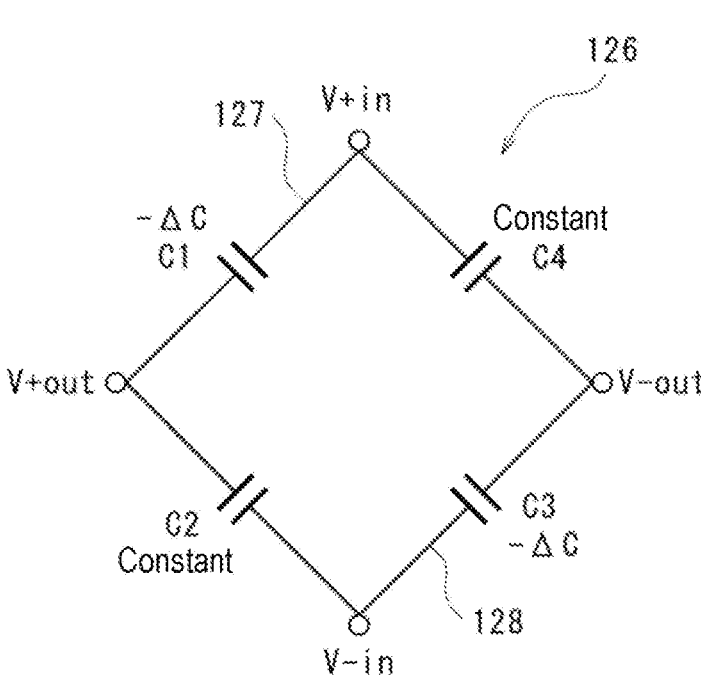
FIG. 16 is an equivalent circuit diagram of the pressure sensor of FIG. 15.

FIG. 16 is an equivalent circuit diagram of a circuit 126 in which the first to fourth capacitors C1 to C4 are combined to form a Wheatstone bridge circuit. In the circuit 126, a first circuit 127 in which the first capacitor C1 and the second capacitor C2 are connected in series in this order and a second circuit 128 in which the fourth capacitor C4 and the third capacitor C3 are connected in series in this order are connected in parallel.

When a drive voltage V+ in is applied to one end of the circuit 126 and a drive voltage V− in is applied to the other end of the circuit 126, the circuit 126 detects a potential difference between a potential V+ out between the first capacitor C1 and the second capacitor C2 in the first circuit 127 and a potential V-out between the fourth capacitor C4 and the third capacitor C3 in the second circuit 128. Based on the detected potential difference, the deformation of the membrane 31 in the first sensor 122 and the third sensor 124 may be calculated, and the pressure of the fluid that is introduced from the outside into the fluid passage 7 may be calculated based on the calculated deformation of the membrane 31.

Fourth Embodiment

Figure 17:
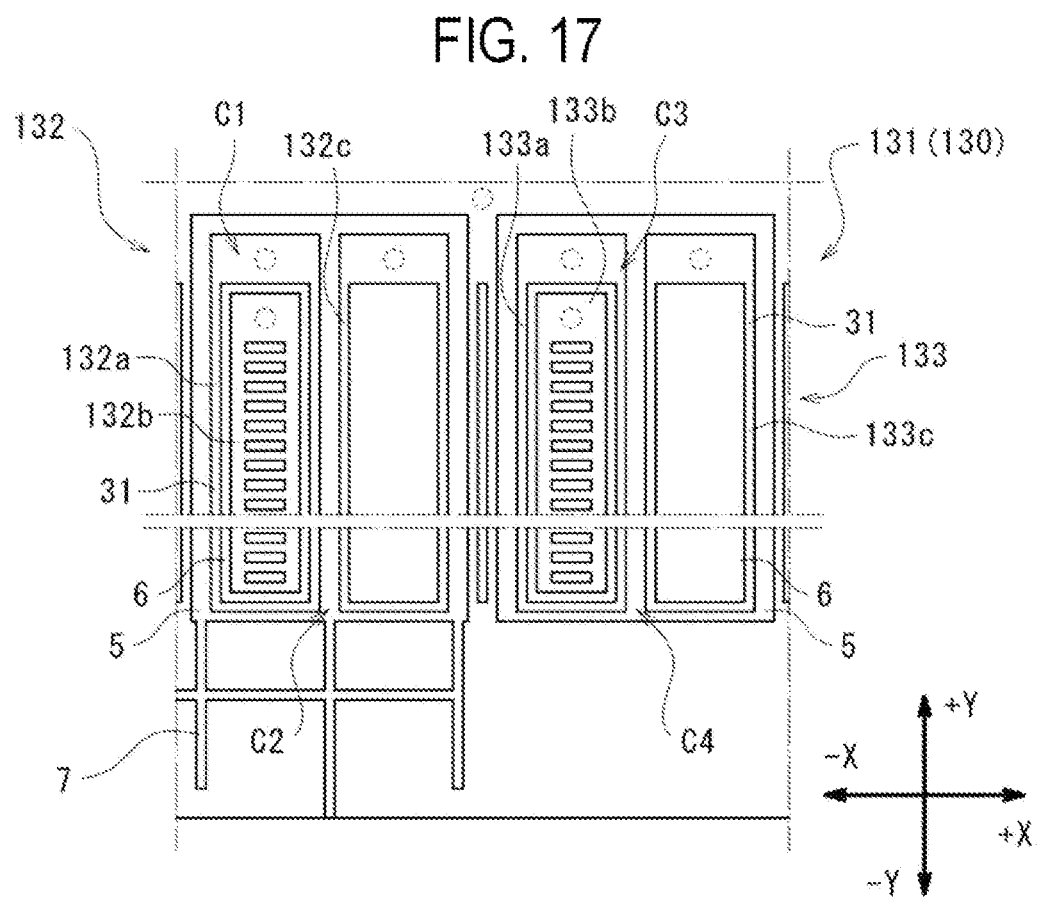

FIG. 17 shows a sensor 131 of a pressure sensor 130 according to a fourth embodiment of the present disclosure. As shown in FIG. 17, the sensor 131 includes a first sensor 132 and a second sensor 133.

The first sensor 132 includes a first capacitor C1 including a quadrangular annular first movable electrode 132a and a first fixed electrode 132b located inside the quadrangular annular first movable electrode 132a, and a second capacitor C2 including a quadrangular annular second movable electrode 132c without a fixed electrode located therein and the first movable electrode 132a.

The second sensor 133 includes a third capacitor C3 including a quadrangular annular third movable electrode 133a and a third fixed electrode 133b located inside the quadrangular annular third movable electrode 133a, and a fourth capacitor C4 including a quadrangular annular fourth movable electrode 133c without a fixed electrode located therein and the third movable electrode 133a.

Capacitances of the first capacitor C1 and the second capacitor C2 change due to deformation of the membrane 31 in the X direction caused by a pressure difference between a pressure of fluid that is introduced into the first chamber 5 from the fluid passage 7 and a pressure of the second chamber 6. Specifically, when the pressure of the first chamber 5 is higher than the pressure of the second chamber 6, the capacitance of the first capacitor C1 increases and the capacitance of the second capacitor C2 decreases. On the other hand, since the first chamber 5 is not connected to the fluid passage 7, the capacitances of the third capacitor C3 and the fourth capacitor C4 have a constant value while the membrane 31 is not deformed. The pressure sensor 130 is configured to combine the first to fourth capacitors C1 to C4 and detect a change in capacitance in the first capacitor C1 and the second capacitor C2.

Figure 18:
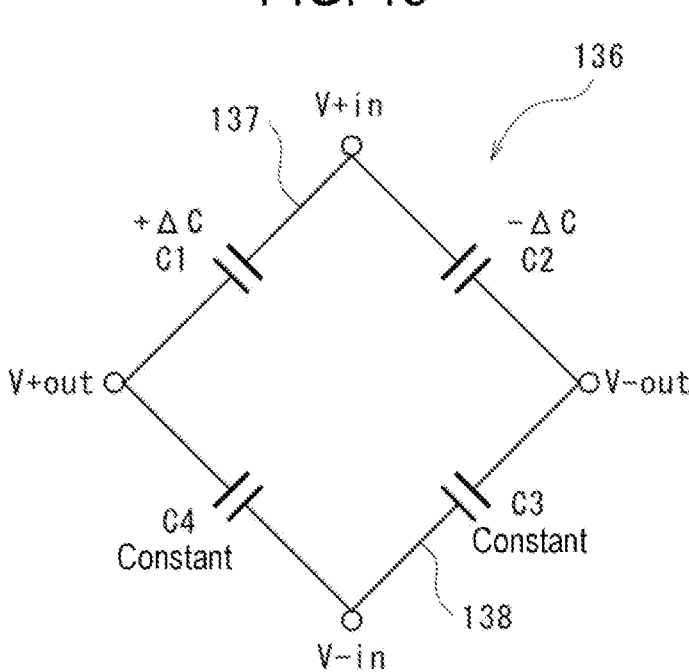
FIG. 18 is an equivalent circuit diagram of the pressure sensor of FIG. 17.

FIG. 18 is an equivalent circuit diagram of a circuit 136 in which the first to fourth capacitors C1 to C4 are combined to form a Wheatstone bridge circuit. In the circuit 136, a first circuit 137 in which the first capacitor C1 and the fourth capacitor C4 are connected in series in this order and a second circuit 138 in which the second capacitor C2 and the third capacitor C3 are connected in series in this order are connected in parallel.

When a drive voltage V+ in is applied to one end of the circuit 136 and a drive voltage V− in is applied to the other end of the circuit 136, the circuit 136 detects a potential difference between a potential V+ out between the first capacitor C1 and the fourth capacitor C4 in the first circuit 137 and a potential V-out between the second capacitor C2 and the third capacitor C3 in the second circuit 138. Based on the detected potential difference, the deformation of the membrane 31 in the first sensor 132 may be calculated, and a pressure of fluid that is introduced from the outside into the fluid passage 7 may be calculated based on the calculated deformation of the membrane 31.

Fifth Embodiment

Figure 19:
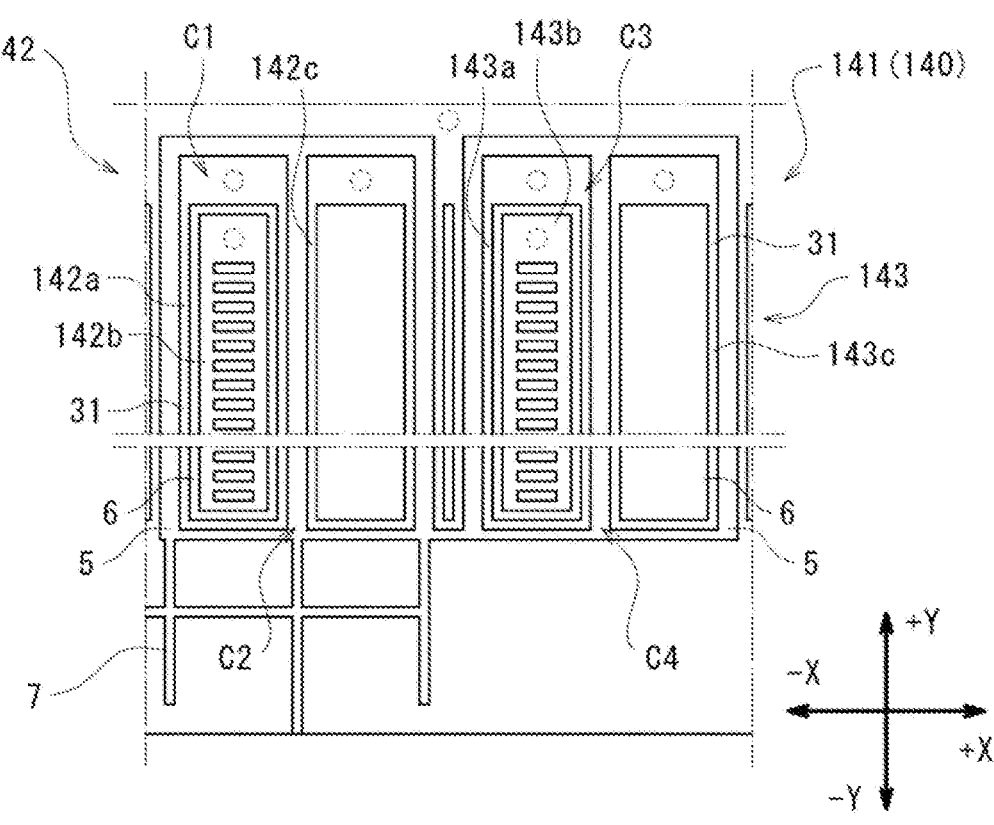
FIG. 19 is a plan view showing a sensor of a pressure sensor according to a fifth embodiment of the present disclosure.

FIG. 19 shows a sensor 141 of a pressure sensor 140 according to a fifth embodiment of the present disclosure. As shown in FIG. 19, the sensor 141 includes a first sensor 142 and a second sensor 143.

The first sensor 142 is configured similarly to the first sensor 132 of the pressure sensor 130 according to the fourth embodiment, and includes a first capacitor C1 including a quadrangular annular first movable electrode 142*a* and a first fixed electrode 142*b* located inside the quadrangular annular first movable electrode 142*a*, and a second capacitor C2 including a quadrangular annular second movable electrode 142*c* without a fixed electrode located therein and the first movable electrode 142*a*.

The second sensor 143 is also configured similarly to the first sensor 142 (that is, is connected to the fluid passage 7), and includes a third capacitor C3 including a quadrangular annular third movable electrode 143*a* and a third fixed electrode 143*b* located inside the quadrangular annular third movable electrode 143*a*, and a fourth capacitor C4 including a quadrangular annular fourth movable electrode 143*c* without a fixed electrode located therein and the third movable electrode 143*a*.

Capacitances of the first to fourth capacitors C1 to C4 change due to deformation of the membrane 31 in the X direction caused by a pressure difference between a pressure of fluid introduced into the first chamber 5 from the fluid passage 7 and a pressure of the second chamber 6. Specifically, when the pressure of the first chamber 5 is higher than the pressure of the second chamber 6, the capacitances of the first capacitor C1 and the third capacitor C3 increase and the capacitances of the second capacitor C2 and the fourth capacitor C4 decrease. The pressure sensor 140 is configured to combine the first to fourth capacitors C1 to C4 and detect a change in capacitance in the first to fourth capacitors C1 to C4.

Figure 20:
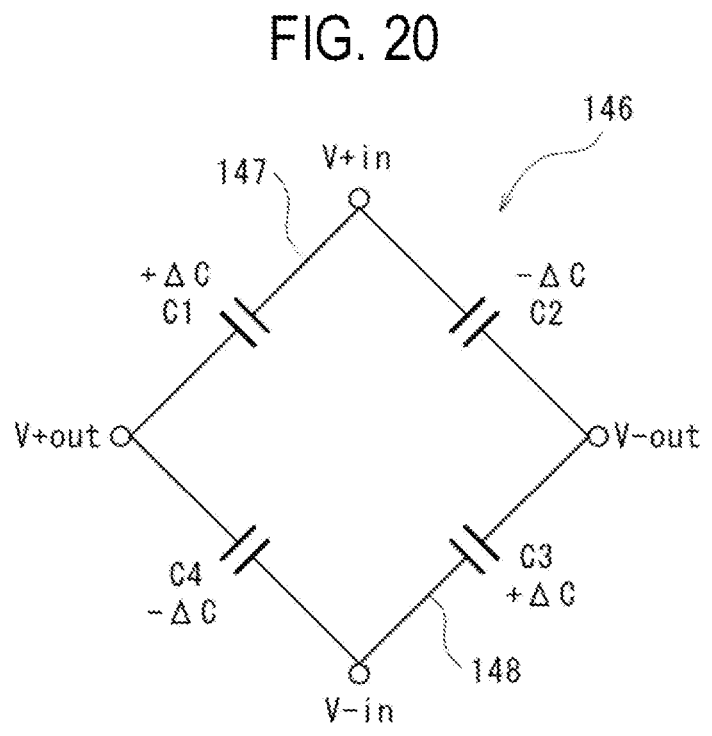

FIG. 20 is an equivalent circuit diagram of a circuit 146 in which the first to fourth capacitors C1 to C4 are combined to form a Wheatstone bridge circuit. In the circuit 146, a first circuit 147 in which the first capacitor C1 and the fourth capacitor C4 are connected in series in this order and a second circuit 148 in which the second capacitor C2 and the third capacitor C3 are connected in series in this order are connected in parallel.

When a drive voltage V+ in is applied to one end of the circuit 146 and a drive voltage V− in is applied to the other end of the circuit 146, the circuit 146 detects a potential difference between a potential V+ out between the first capacitor C1 and the fourth capacitor C4 in the first circuit 147 and a potential V-out between the second capacitor C2 and the third capacitor C3 in the second circuit 148. Based on the detected potential difference, the deformation of the membrane 31 in the first and second sensors 142 and 143 may be calculated, and the pressure of the fluid that is introduced from the outside into the fluid passage 7 may be calculated based on the calculated deformation of the membrane 31.

SUPPLEMENTARY NOTES

The pressure sensor and the method of manufacturing the pressure sensor according to the present disclosure provide the following aspects.

Supplementary Note 1

According to an aspect of the present disclosure, there is provided a pressure sensor including:

a substrate that has a first main surface and a second main surface facing the first main surface and has a thickness in a first direction where the first main surface and the second main surface face each other;

a first chamber that is recessed from the first main surface in the first direction with respect to the substrate;

at least one second chamber that is recessed from the first main surface in the first direction with respect to the substrate and is adjacent to the first chamber at an interval in a second direction orthogonal to the first direction;

a fluid passage that is recessed from the first main surface in the first direction with respect to the substrate and causes the first chamber to be in fluid communication with an outside;

a closing layer that is laminated on the first main surface of the substrate and closes openings of at least the first chamber and the at least one second chamber on the first main surface; and at least one membrane that is partitioned by the first chamber and the at least one second chamber in the substrate between the first chamber and the at least one second chamber in the second direction and extends in a plane parallel to the first direction and a third direction orthogonal to the first direction and the second direction.

Supplementary Note 2

In the pressure sensor of Supplementary Note 1, the substrate includes a first substrate located near the first main surface and a second substrate located on a side of the first substrate near the second main surface, the first substrate and the second substrate are laminated to form a pn junction therebetween, a reverse bias voltage is applied between the first substrate and the second substrate, and the at least one membrane is formed over the first substrate and the second substrate.

Supplementary Note 3

The pressure sensor of Supplementary Note 1 or 2, further includes: a wiring connection portion that is partitioned by the first chamber and the at least one second chamber with respect to the substrate, is electrically linked to the at least one membrane, has a thickness dimension larger than that of the at least one membrane, and is formed over the first substrate and the second substrate.

Supplementary Note 4

In the pressure sensor of any one of Supplementary Notes 1 to 3, the at least one membrane has a depth dimension in the first direction greater than a thickness dimension in the second direction.

Supplementary Note 5

In the pressure sensor of any one of Supplementary Notes 1 to 5, the at least one membrane has a thickness dimension of 1.5 µm or more and less than 3 µm in the second direction.

Supplementary Note 6

In the pressure sensor of any one of Supplementary Notes 1 to 5, the at least one membrane has a width dimension in the third direction greater than a depth dimension in the first direction.

Supplementary Note 7

The pressure sensor of any one of Supplementary Notes 1 to 6, further includes:
a fixed electrode that is partitioned on an opposite side of the at least one membrane by the at least one second chamber in the substrate and faces the at least one membrane in the second direction; and
a capacitor including the at least one membrane and the fixed electrode.

Supplementary Note 8

In the pressure sensor of any one of Supplementary Notes 1 to 7, the at least one second chamber includes a pair of second chambers,
the pair of second chambers are located on both sides of the first chamber with the first chamber being interposed between the pair of second chambers,
the at least one membrane includes a pair of membranes,
each of the pair of membranes is located between the first chamber and each of the pair of second chambers, and
a capacitor is formed by the pair of membranes.

Supplementary Note 9

In the pressure sensor of any one of Supplementary Notes 1 to 8, a sealing layer is further laminated on a surface of the closing layer on an opposite side of the substrate.

Supplementary Note 10

In the pressure sensor of any one of Supplementary Notes 1 to 9, the closing layer is made of monosilicon or polysilicon.

Supplementary Note 11

In the pressure sensor of any one of Claims 1 to 10, the fluid passage is in fluid communication with the outside by dicing the substrate at a portion where the fluid passage is located.

Supplementary Note 12

In the pressure sensor of any one of Supplementary Notes 1 to 11, the fluid passage includes a plurality of paths in fluid communication with the outside.

Supplementary Note 13

In the pressure sensor of any one of Supplementary Notes 1 to 11, the fluid passage is connected to the first chamber at a plurality of points.

Supplementary Note 14

In the pressure sensor of any one of Supplementary Notes 1 to 13, the pressure sensor is wrapped with resin.

Supplementary Note 15

In the pressure sensor of Supplementary Note 7, when viewed in the first direction, the at least one second chamber extends so as to surround the fixed electrode, the at least one membrane extends to surround the at least one second chamber, and the first chamber extends to surround the at least one membrane.

Supplementary Note 16

In the pressure sensor of any one of Supplementary Notes 1 to 15, the at least one membrane is set as a first membrane,
the pressure sensor further comprises:
a third chamber that is recessed from the first main surface in the first direction with respect to the substrate;
at least one fourth chamber that is recessed from the first main surface in the first direction with respect to the substrate and is adjacent to the third chamber at an interval in the second direction; and
at least one second membrane that is partitioned by the third chamber and the at least one fourth chamber in the substrate between the third chamber and the at least one fourth chamber in the second direction, extends in a plane parallel to the first direction and the third direction orthogonal to the first direction and the second direction, and is formed over the first substrate and the second substrate, and
the third chamber and the at least one fourth chamber include openings on the first main surface that are closed by the closing layer and sealed from the outside.

Supplementary Note 17

The pressure sensor of Supplementary Note 16, further includes:

a second fixed electrode that is partitioned by the at least one fourth chamber on an opposite side of the at least one second membrane in the substrate and faces the at least one second membrane in the second direction; and a second capacitor formed by the at least one second membrane and the second fixed electrode.

Supplementary Note 18

In the pressure sensor of Supplementary Note 16, the at least one fourth chamber includes a pair of fourth chambers, the pair of fourth chambers are located on both sides of the third chamber in the second direction with the third chamber being interposed between the pair of fourth chambers, the at least one second membrane includes a pair of second membranes, each of the pair of second membranes is located between the third chamber and each of the pair of fourth chambers, and a second capacitor is formed by the pair of second membranes.

Supplementary Note 19

According to another aspect of the present disclosure, there is provided a method of manufacturing a pressure sensor, including:

providing a substrate that has a first main surface and a second main surface facing the first main surface and has a thickness in a first direction extending between the first main surface and the second main surface;

forming a first trench that is recessed from the first main surface in the first direction with respect to the substrate;

forming a second trench that is recessed from the first main surface in the first direction with respect to the substrate and is adjacent to the first trench at an interval in a second direction orthogonal to the first direction;

forming a third trench that is recessed from the first main surface in the first direction with respect to the substrate and causes the first trench to be in fluid communication with an outside;

laminating a closing layer on the first main surface of the substrate, the closing layer closing openings of at least the first trench and the second trench on the first main surface; and forming a membrane that partitions the substrate by the first trench and the second trench in the second direction and extends between the first trench and the second trench in a plane parallel to the first direction and a third direction orthogonal to the first direction and the second direction.

Supplementary Note 20

In the method of Supplementary Note 19, the substrate is formed by laminating a first substrate, which is located near the first main surface, on a side of a second substrate, which is located on a side of the first substrate near the second main surface, near the first main surface, when forming the first trench, the first trench penetrates the first substrate to reach the second substrate, and when forming the second trench, the second trench penetrates the first substrate to reach the second substrate.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A pressure sensor comprising:

a substrate that has a first main surface and a second main surface facing the first main surface and has a thickness in a first direction where the first main surface and the second main surface face each other;

a first chamber that is recessed from the first main surface in the first direction with respect to the substrate;

at least one second chamber that is recessed from the first main surface in the first direction with respect to the substrate and is adjacent to the first chamber at an interval in a second direction orthogonal to the first direction;

a fluid passage that is recessed from the first main surface in the first direction with respect to the substrate and causes the first chamber to be in fluid communication with an outside;

a closing layer that is laminated on the first main surface of the substrate and closes openings of at least the first chamber and the at least one second chamber on the first main surface; and at least one membrane that is partitioned by the first chamber and the at least one second chamber in the substrate between the first chamber and the at least one second chamber in the second direction and extends in a plane parallel to the first direction and a third direction orthogonal to the first direction and the second direction.

2. The pressure sensor of claim 1, wherein the substrate includes a first substrate located near the first main surface and a second substrate located on a side of the first substrate near the second main surface, wherein the first substrate and the second substrate are laminated to form a pn junction therebetween, wherein a reverse bias voltage is applied between the first substrate and the second substrate, and wherein the at least one membrane is formed over the first substrate and the second substrate.

3. The pressure sensor of claim 2, wherein the at least one membrane is set as a first membrane, wherein the pressure sensor further comprises:

a third chamber that is recessed from the first main surface in the first direction with respect to the substrate;

at least one fourth chamber that is recessed from the first main surface in the first direction with respect to the substrate and is adjacent to the third chamber at an interval in the second direction; and at least one second membrane that is partitioned by the third chamber and the at least one fourth chamber in the substrate between the third chamber and the at least one fourth chamber in the second direction, extends in a plane parallel to the first direction and the third direction orthogonal to the first direction and the second direction, and is formed over the first substrate and the second substrate, and wherein the third chamber and the at least one fourth chamber include openings on the first main surface that are closed by the closing layer and sealed from the outside.

4. The pressure sensor of claim 3, further comprising:
a second fixed electrode that is partitioned by the at least one fourth chamber on an opposite side of the at least one second membrane in the substrate and faces the at least one second membrane in the second direction; and
a second capacitor formed by the at least one second membrane and the second fixed electrode.

5. The pressure sensor of claim 3, wherein the at least one fourth chamber includes a pair of fourth chambers,
wherein the pair of fourth chambers are located on both sides of the third chamber in the second direction with the third chamber being interposed between the pair of fourth chambers,
wherein the at least one second membrane includes a pair of second membranes,
wherein each of the pair of second membranes is located between the third chamber and each of the pair of fourth chambers, and
wherein a second capacitor is formed by the pair of second membranes.

6. The pressure sensor of claim 2, further comprising: a wiring connection portion that is partitioned by the first chamber and the at least one second chamber with respect to the substrate, is electrically linked to the at least one membrane, has a thickness dimension larger than that of the at least one membrane, and is formed over the first substrate and the second substrate.

7. The pressure sensor of claim 1, wherein the at least one membrane has a depth dimension in the first direction greater than a thickness dimension in the second direction.

8. The pressure sensor of claim 1, wherein the at least one membrane has a thickness dimension of 1.5 μm or more and less than 3 μm in the second direction.

9. The pressure sensor of claim 1, wherein the at least one membrane has a width dimension in the third direction greater than a depth dimension in the first direction.

10. The pressure sensor of claim 1, further comprising:
a fixed electrode that is partitioned on an opposite side of the at least one membrane by the at least one second chamber in the substrate and faces the at least one membrane in the second direction; and
a capacitor including the at least one membrane and the fixed electrode.

11. The pressure sensor of claim 10, wherein when viewed in the first direction, the at least one second chamber extends so as to surround the fixed electrode, the at least one membrane extends to surround the at least one second chamber, and the first chamber extends to surround the at least one membrane.

12. The pressure sensor of claim 1, wherein the at least one second chamber includes a pair of second chambers,
wherein the pair of second chambers are located on both sides of the first chamber with the first chamber being interposed between the pair of second chambers,
wherein the at least one membrane includes a pair of membranes, wherein each of the pair of membranes is located between the first chamber and each of the pair of second chambers, and
wherein a capacitor is formed by the pair of membranes.

13. The pressure sensor of claim 1, wherein a sealing layer is further laminated on a surface of the closing layer on an opposite side of the substrate.

14. The pressure sensor of claim 1, wherein the closing layer is made of monosilicon or polysilicon.

15. The pressure sensor of claim 1, wherein the fluid passage is in fluid communication with the outside by dicing the substrate at a portion where the fluid passage is located.

16. The pressure sensor of claim 1, wherein the fluid passage includes a plurality of paths in fluid communication with the outside.

17. The pressure sensor of claim 1, wherein the fluid passage is connected to the first chamber at a plurality of points.

18. The pressure sensor of claim 1, wherein the pressure sensor is wrapped with resin.

19. A method of manufacturing a pressure sensor, comprising:
providing a substrate that has a first main surface and a second main surface facing the first main surface and has a thickness in a first direction extending between the first main surface and the second main surface;
forming a first trench that is recessed from the first main surface in the first direction with respect to the substrate;
forming a second trench that is recessed from the first main surface in the first direction with respect to the substrate and is adjacent to the first trench at an interval in a second direction orthogonal to the first direction;
forming a third trench that is recessed from the first main surface in the first direction with respect to the substrate and causes the first trench to be in fluid communication with an outside;
laminating a closing layer on the first main surface of the substrate, the closing layer closing openings of at least the first trench and the second trench on the first main surface; and
forming a membrane that partitions the substrate by the first trench and the second trench in the second direction and extends between the first trench and the second trench in a plane parallel to the first direction and a third direction orthogonal to the first direction and the second direction.

20. The method of claim 19, wherein the substrate is formed by laminating a first substrate, which is located near the first main surface, on a side of a second substrate, which is located on a side of the first substrate near the second main surface, near the first main surface,
wherein when forming the first trench, the first trench penetrates the first substrate to reach the second substrate, and
wherein when forming the second trench, the second trench penetrates the first substrate to reach the second substrate.

\* \* \* \* \*